US012099332B2

(12) United States Patent
Kiuchi et al.

(10) Patent No.: US 12,099,332 B2
(45) Date of Patent: Sep. 24, 2024

(54) DISPLAY CONTROL DEVICE, ELECTRONIC WATCH, DISPLAY CONTROL METHOD, AND RECORDING MEDIUM

(71) Applicant: CASIO COMPUTER CO., LTD., Tokyo (JP)

(72) Inventors: Toshihiro Kiuchi, Hachioji (JP); Yuuichi Sagou, Tokyo (JP); Masaki Ito, Ome (JP); Kousuke Ishizaki, Mitaka (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 475 days.

(21) Appl. No.: 17/465,901

(22) Filed: Sep. 3, 2021

(65) Prior Publication Data
US 2022/0091566 A1 Mar. 24, 2022

(30) Foreign Application Priority Data

Sep. 24, 2020 (JP) ................................ 2020-159581
Sep. 24, 2020 (JP) ................................ 2020-159582

(51) Int. Cl.
*G04G 9/00* (2006.01)
*G04G 21/00* (2010.01)
*G06F 1/16* (2006.01)
*G06F 3/01* (2006.01)
*G01C 21/36* (2006.01)
*G04G 9/12* (2006.01)

(52) U.S. Cl.
CPC .......... *G04G 9/0064* (2013.01); *G04G 21/00* (2013.01); *G06F 1/163* (2013.01); *G06F 3/011* (2013.01); *G01C 21/3667* (2013.01); *G04G 9/12* (2013.01)

(58) Field of Classification Search
None
See application file for complete search history.

(56) References Cited

U.S. PATENT DOCUMENTS

| 10,706,067 | B2 | 7/2020 | Imamura | |
| 11,391,944 | B2 | 7/2022 | Kawano | |
| 2018/0181081 | A1* | 6/2018 | Imamura | .............. G04G 9/0064 |

(Continued)

FOREIGN PATENT DOCUMENTS

| JP | 2018106119 A | 7/2018 |
| JP | 2019020558 A | 2/2019 |

(Continued)

OTHER PUBLICATIONS

Japanese Office Action (and English language translation thereof) dated Sep. 20, 2022, issued in counterpart Japanese Application No. 2020-159581.

(Continued)

*Primary Examiner* — Martin Mushambo
(74) *Attorney, Agent, or Firm* — Holtz, Holtz & Volek PC

(57) ABSTRACT

A CPU determines whether a first condition related to a current position of a subject is satisfied, determines whether a second condition different from the first condition and related to at least one of the current position of the subject and a motion state of the subject is satisfied, and controls a display mode of a display unit on the basis of a determination result as to whether the first condition is satisfied and a determination result as to whether the second condition is satisfied.

13 Claims, 12 Drawing Sheets

(56) References Cited

U.S. PATENT DOCUMENTS

2018/0181633 A1\* 6/2018 Imamura ............. G06F 3/04883
2019/0018445 A1\* 1/2019 Watanabe ............. G06F 1/3265

FOREIGN PATENT DOCUMENTS

| JP | 2020076754 A | 5/2020 |
| JP | 2022053012 A | 4/2022 |
| WO | 2018173399 A1 | 9/2018 |

OTHER PUBLICATIONS

Japanese Office Action (and English language translation thereof) dated Jun. 18, 2024, issued in counterpart Japanese Application No. 2023-05975.

\* cited by examiner

DAILY FACE

DAILY ACTIVE FACE

NON-DAILY HOME TIME ZONE FACE

NON-DAILY HOME TIME ZONE ACTIVE FACE

NON-DAILY OUTSIDE HOME TIME ZONE FACE

NON-DAILY OUTSIDE HOME TIME ZONE ACTIVE FACE

| FACE NUMBER (FACE FLAG) | FACE TYPE |
|---|---|
| 1 | DAILY FACE |
| 2 | DAILY ACTIVE FACE |
| 3 | NON-DAILY HOME TIME ZONE FACE |
| 4 | NON-DAILY HOME TIME ZONE ACTIVE FACE |
| 5 | NON-DAILY OUTSIDE HOME TIME ZONE FACE |
| 6 | NON-DAILY OUTSIDE HOME TIME ZONE ACTIVE FACE |

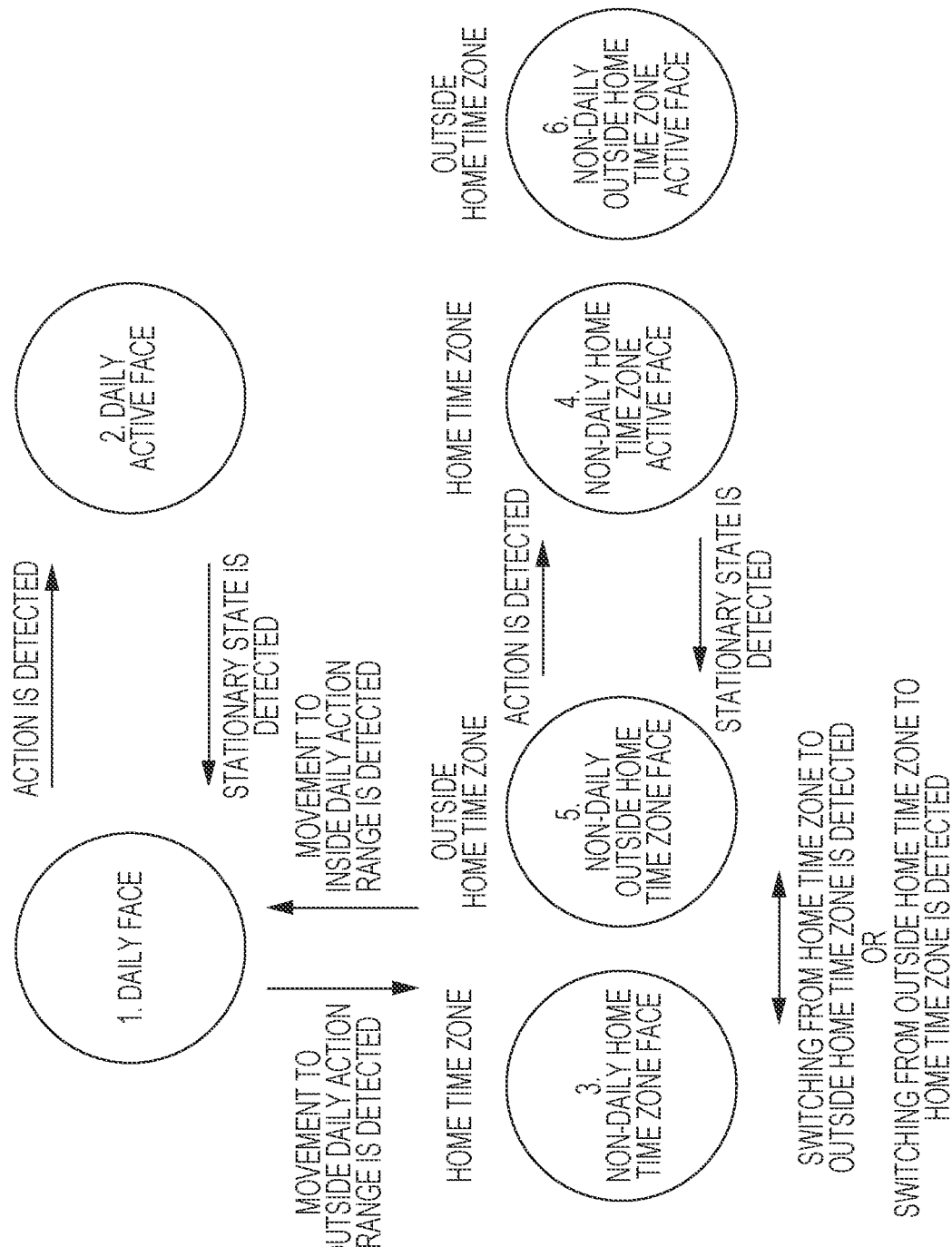

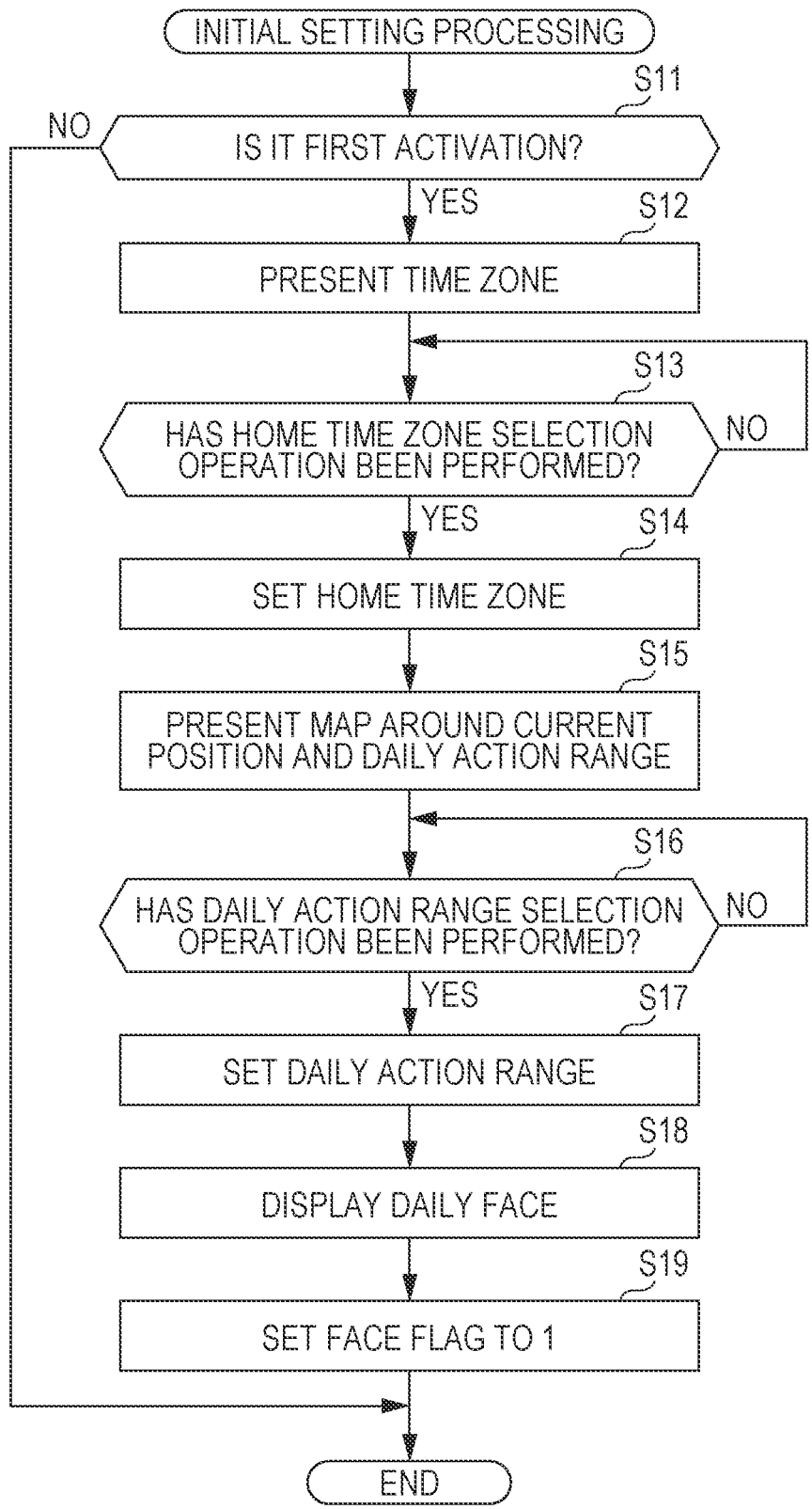

DISPLAY CONTROL DEVICE, ELECTRONIC WATCH, DISPLAY CONTROL METHOD, AND RECORDING MEDIUM

BACKGROUND

1. Technical Field

The present invention relates to a display control device that controls display of a portable display device, an electronic watch, a display control method, and a recording medium.

2. Related Art

A smart watch that displays a map on a back surface of an analog watch display has been proposed (for example, JP 2020-76754 A).

SUMMARY

A display control device according to the present invention includes: at least one processor configured to execute a program stored in at least one memory, in which the at least one processor determines whether a first condition related to a current position of a subject is satisfied, determines whether a second condition different from the first condition and including a condition related to at least one of the current position of the subject and a motion state of the subject is satisfied, and controls a display mode of a display device carried by the subject based on a determination result as to whether the first condition is satisfied and a determination result as to whether the second condition is satisfied.

BRIEF DESCRIPTION OF THE DRAWINGS

FIG. 5 is a transition diagram of the face;

FIG. 6 is a flowchart illustrating an example of initial setting processing;

DETAILED DESCRIPTION

Embodiments of the present invention will be described below with reference to the drawings.

Figure 1:
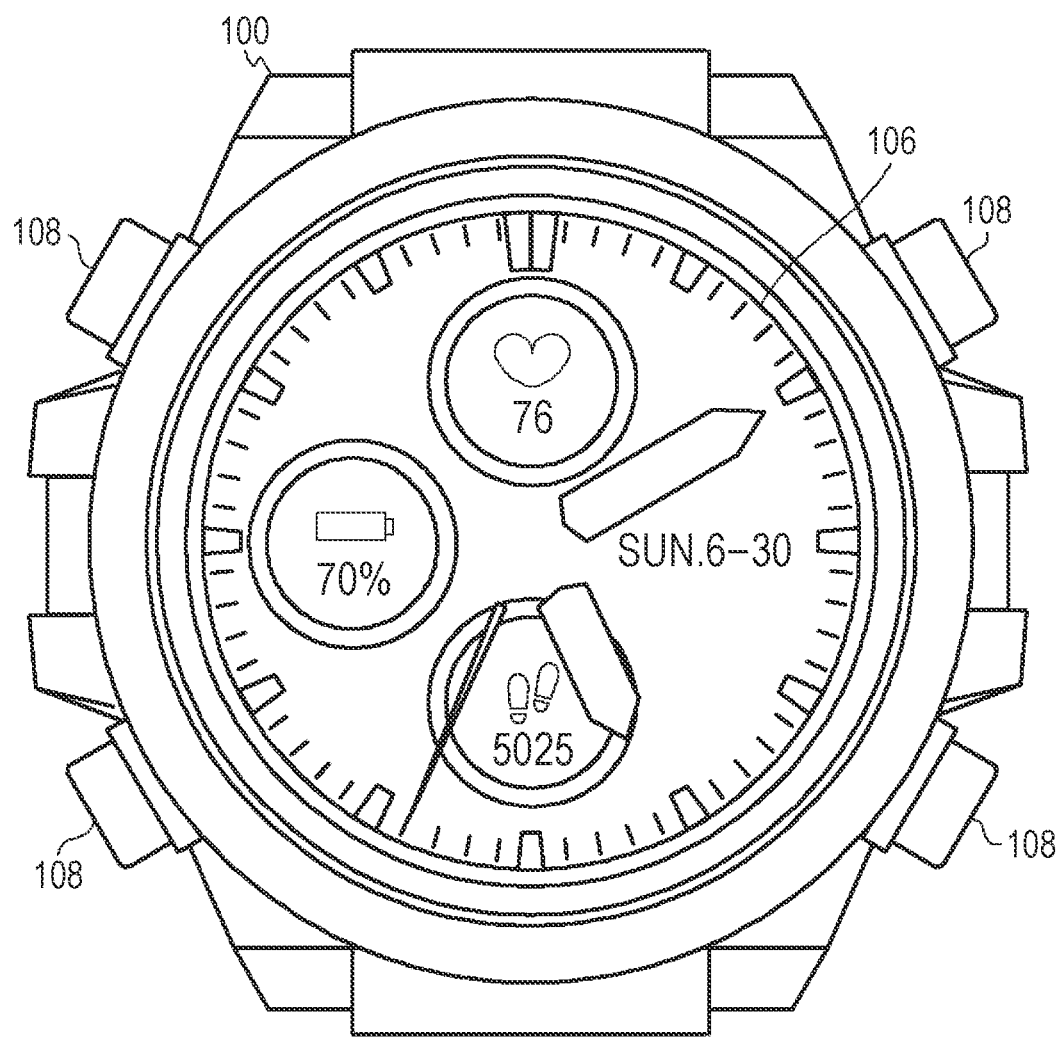
FIG. 1 is an external view of an electronic watch according to an embodiment of the present invention.

FIG. 1 is an external view of an electronic watch 100 including a display control device and a display device of the present invention. As illustrated in FIG. 1, the electronic watch 100 includes a display unit 106 as a display device that displays time and various types of information, and a plurality of push-button switches constituting an operation reception unit 108 that receives operation of a user as a subject. As described above, the electronic watch 100 of this embodiment is a display device carried and used by the user (subject), and is used by being worn on the arm by, for example, a band (not illustrated). The electronic watch 100 is a so-called smart watch.

As illustrated in FIG. 1, the electronic watch 100 according to the present embodiment has a function of displaying a current time by displaying a hand image on the display unit 106 according to the time imitating an analog watch. The electronic watch 100 can display various types of information (heart rate, number of steps, remaining battery level, map information, current position information, and the like) on the display unit 106 in addition to the time information. Details of the information that can be displayed on the display unit 106 will be described later.

The electronic watch 100 may be a digital watch that displays a time by a number, or may be capable of switching a face between an analog watch and a digital watch.

Figure 2:
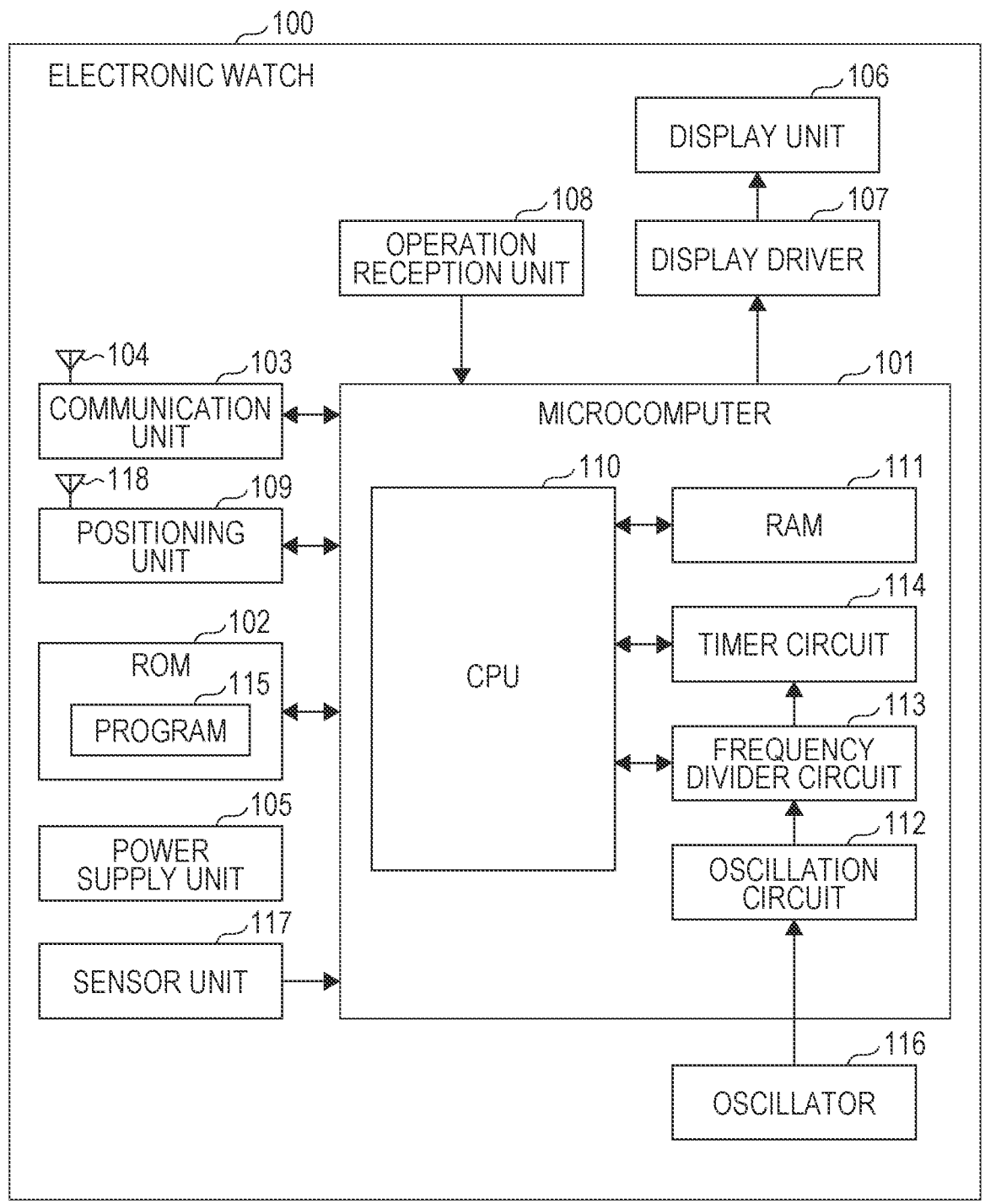
FIG. 2 is a block diagram illustrating a configuration of the electronic watch according to the embodiment of the present invention.

Next, a hardware configuration of the electronic watch 100 according to the embodiment will be described. FIG. 2 is a block diagram illustrating a configuration of the electronic watch 100 according to the embodiment of the present invention. The electronic watch 100 includes a microcomputer 101, a read only memory (ROM) 102 as at least one memory, a communication unit 103, an antenna 104, a power supply unit 105, a display unit 106, a display driver 107, an operation reception unit 108, a positioning unit 109, a positioning antenna 118, an oscillator 116, and a sensor unit 117.

The microcomputer 101 includes a central processing unit (CPU) 110 as at least one processor, a random access memory (RAM) 111, an oscillation circuit 112, a frequency divider circuit 113, a timer circuit 114, and the like. The RAM 111, the oscillation circuit 112, the frequency divider circuit 113, and the timer circuit 114 are not limited to being provided inside the microcomputer 101, and at least a part thereof may be provided outside the microcomputer 101. The ROM 102, the communication unit 103, the antenna 104, the power supply unit 105, the display driver 107, the positioning unit 109, and the sensor unit 117 are not limited to being provided outside the microcomputer 101, and at least a part thereof may be provided inside the microcomputer 101.

The CPU 110 is a processor that performs various arithmetic processing and integrally controls the entire operation of the electronic watch 100. The CPU 110 reads a control program from the ROM 102, loads the control program into the RAM 111, and performs various operation processing such as arithmetic control and display related to various functions. The CPU 110 controls the communication unit 103 to communicate with an external device. The microcomputer 101 or the CPU 110 functions as a display control device of the present invention.

The RAM 111 is a volatile memory such as a static random access memory (SRAM) or a dynamic random access memory (DRAM). The RAM 111 stores temporary data and stores various types of setting data.

The oscillation circuit 112 oscillates the oscillator 116 to generate and output a predetermined frequency signal (clock signal).

The frequency divider circuit 113 divides the frequency signal input from the oscillation circuit 112 into a signal of a frequency used by the timer circuit 114 and the CPU 110 and outputs the signal. The frequency of the output signal may be changed on the basis of setting by the CPU 110.

The timer circuit 114 counts the number of times of input of the signal input from the frequency divider circuit 113 and adds the counted number to an initial value to time the current time. The timer circuit 114 may be configured by software that changes a value to be stored in the RAM 111, or may be configured by dedicated hardware. The time counted by the timer circuit 114 may be any of a cumulative time from a predetermined timing, coordinated universal time (UTC), a preset city time (local time), or the like. The time measured by the timer circuit 114 may not necessarily be in the form of year, month, day, hour, minute, and second.

The ROM 102 is a nonvolatile memory or the like, and stores a control program and initial setting data. The control program includes a program 115 related to control of various processes described later.

The communication unit 103 includes a wireless communication module for short-range wireless communication such as Bluetooth (registered trademark) or wireless local area network (LAN) communication, and performs wireless communication with an external electronic device via the antenna 104. For example, the communication unit 103 demodulates and decodes the radio signal received via the antenna 104, and transmits the demodulated and decoded radio signal to the CPU 110. The communication unit 103 encodes, modulates, and the like a signal transmitted from the CPU 110, and transmits the signal to the outside via the antenna 104.

The power supply unit 105 includes, for example, a battery and a voltage conversion circuit. The power supply unit 105 supplies power with an operating voltage of each unit in the electronic watch 100. As the battery of the power supply unit 105, for example, a primary battery such as a button battery or a secondary battery such as a lithium ion battery is used.

The display unit 106 includes, for example, a display panel such as a liquid crystal display (LCD) or an organic electro-luminescent (EL) display. The display driver 107 outputs a drive signal corresponding to the type of the display unit 106 to the display unit 106 on the basis of a control signal from the microcomputer 101, and displays various types of information on the display panel. The display unit 106 displays, for example, the current time counted by the timer circuit 114 with a hand image imitating an analog watch.

The display unit 106 may include a two-layer liquid crystal in which a monochrome liquid crystal and a color liquid crystal (or color organic EL) are stacked. In this case, for example, a monochrome liquid crystal capable of transmitting light is stacked on the front surface of the color liquid crystal. The time and the like may be displayed by color liquid crystal with monochrome liquid crystal in the transmissive state at the normal time, and the time and the like may be displayed by monochrome liquid crystal with color liquid crystal turned off at the time of power saving (when it is determined as the power saving mode or the non-use).

The operation reception unit 108 receives input operation from a user and outputs an electric signal corresponding to the input operation to the microcomputer 101 as an input signal. In the present embodiment, the operation reception unit 108 includes a push button switch illustrated in FIG. 1 and a touch panel provided to overlap the display unit 106. The push button switch is pressed by the user to output an ON signal to the microcomputer 101, and is released to output an OFF signal to the microcomputer 101. The touch panel is configured by a touch panel of a capacitance type, a resistive film type, or the like. The touch panel detects a contact position and a contact mode related to contact operation of the user, and outputs an operation signal corresponding to the detected contact position and contact mode to the CPU 110. The operation reception unit 108 may be configured by any one of a push button switch and a touch panel, or may include another operation reception unit 108 such as a crown.

The positioning unit 109 captures, receives, and demodulates a radio wave from a positioning satellite related to a positioning system such as a global positioning system (GPS) by the positioning antenna 118, and outputs the acquired current position information and time information to the CPU 110.

The sensor unit 117 includes, for example, various sensors such as a pulse sensor, a geomagnetic sensor, an acceleration sensor, a gyro sensor, and an illuminance sensor, and detects and measures user information (pulse, presence/absence of motion, posture, and the like). The sensor unit 117 outputs a signal representing the detected and measured data to the CPU 110.

The electronic watch 100 may include other components such as an input and output terminal, a camera, a microphone, and a vibrator in addition to the components illustrated in FIG. 2. A part of the components illustrated in FIG. 2 may be omitted.

Next, a functional configuration of the CPU 110 of the electronic watch 100 according to the embodiment will be described.

The CPU 110 determines whether a first condition related to the current position of the user (subject) of the electronic watch 100 is satisfied. Specifically, the CPU 110 determines whether the current position acquired by the positioning unit 109 is within a preset daily action range of the user. The daily action range of the user is an action range of the user in daily life, and the user can set an arbitrary range. The daily action range may be automatically determined from current position information, accumulation of the action range of the user, or the like, and the daily action range of the user may be automatically set.

The CPU 110 determines whether a second condition that is different from the first condition and relates to at least one of the current position of the user (subject) of the electronic watch 100 and the motion state of the subject is satisfied. Specifically, the CPU 110 determines whether the user is performing an action (walking, running, movement by bicycle, or the like) on the basis of a movement situation of the current position acquired by the positioning unit 109, the detection result of operation by the sensor unit 117, and a measurement result. When the communication unit 103 receives a time zone switching notification from an external device (for example, a smartphone) or when the user operates the operation reception unit 108 to switch the time zone, the CPU 110 determines whether the switched time zone is a preset home time zone of the user. In other words, the CPU 110 determines whether the time zone has been switched from the home time zone to the outside time zone, or whether the time zone has been switched from the outside home time zone to the time zone. The CPU 110 may determine whether the current position acquired by the positioning unit 109 is in the home time zone.

The CPU 110 controls a display mode of the display device carried by the user (subject) on the basis of the determination result as to whether the first condition described above is satisfied and the determination result as to whether the second condition described above is satisfied. Specifically, the CPU 110 selects a watch face of the display unit 106 of the electronic watch 100 from a plurality of types on the basis of the determination result as to whether the first condition is satisfied and the determination result as to whether the second condition is satisfied, and displays, on the display unit 106, the face according to the determination result as to whether the first condition is satisfied and the determination result as to whether the second condition is satisfied.

The functional configuration of the CPU 110 described here is an example, and the CPU 110 achieves various functions in order to achieve various functions of the electronic watch 100 of this embodiment.

Figure 3A:
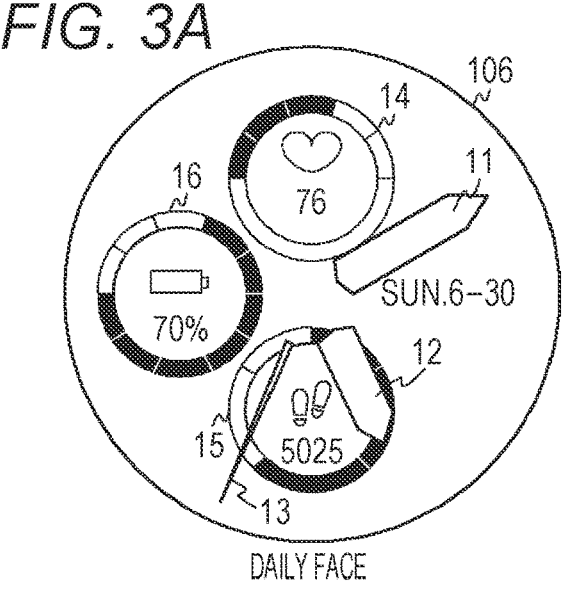
FIGS. 3A to 3F are diagrams illustrating specific examples of a face of the electronic watch according to the present embodiment.
Figure 3B:
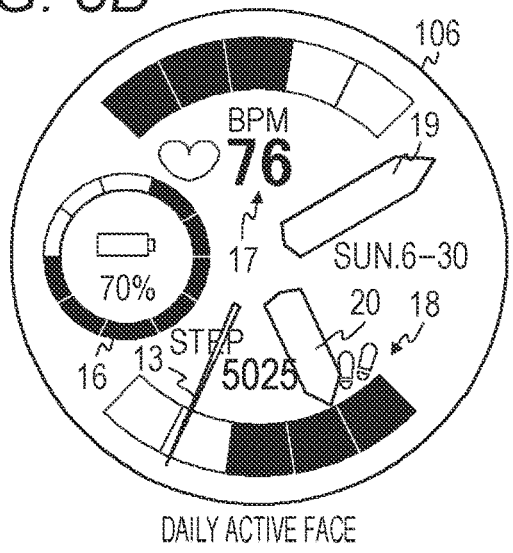

FIGS. 3A to 3F are diagrams illustrating specific examples of watch faces displayed on the display unit 106 of the electronic watch 100 according to this embodiment. As illustrated in FIGS. 3A to 3F, the electronic watch 100 according to this embodiment is provided with six types of faces, and the faces are automatically switched according to the situation of the user. FIGS. 3A and 3B illustrate faces displayed on the display unit 106 when the current position of the user is determined to be within the daily action range. Then, FIG. 3A is a face displayed on the display unit 106 when it is determined that the user is not performing an action, in other words, the user is stationary, and is also referred to as a daily face in this embodiment. FIG. 3B is a face displayed on the display unit 106 when it is determined that the user is performing an action, and is also referred to as a daily active face in this embodiment.

On the daily face illustrated in FIG. 3A, a long hand 11, a short hand 12, a second hand 13, a heart rate display 14, a step number display 15, and a remaining battery level display 16 are displayed. The current time is indicated by the long hand 11, the short hand 12, and the second hand 13. The heart rate display 14 indicates a heart rate of the user of electronic watch 100. The step number display 15 indicates the number of steps of the user of the electronic watch 100. The step number display 15 may be reset, for example, when the user operates or the date is updated. The remaining battery level display 16 indicates the remaining battery level of the electronic watch 100.

The display unit 106 has a plurality of display layers as display layers of color liquid crystal, and on the daily face, the long hand 11, the short hand 12, and the second hand 13 are displayed on a display layer higher than (in the front side of) the heart rate display 14, the step number display 15, and the remaining battery level display 16. On the daily face, the long hand 11, the short hand 12, and the second hand 13 do not transmit through the lower (rear side) layer and are displayed in a mode of being superimposed on the heart rate display 14, the step number display 15, and the remaining battery level display 16. As a result, on the daily face displayed when it is determined that the user is stationary, the visibility of the time information is high, and the user can easily grasp the current time.

The display layer of each piece of information may be switched by touching the display unit 106 (touch panel). For example, the information of the touched portion may be switched to an upper display layer.

On the daily active face illustrated in FIG. 3B, a long hand 19, a short hand 20, a second hand 13, a heart rate display 17, a step number display 18, and a remaining battery level display 16 are displayed. In FIGS. 3A to 3F, description of reference numerals and description of components already described may be omitted. On the daily active face, types of information displayed are similar to those on the daily active face, but display modes of the information are different. Specifically, the heart rate display 17 and the step number display 18 are displayed in an enlarged mode and in different designs than the heart rate display 14 and the step number display 15 on the daily face. The long hand 19 and the short hand 20 are displayed in a mode of transmitting the back surface, and have lower visibility than the long hand 11 and the short hand 12 on the daily face. As a result, the daily active face is easier to visually recognize the activity information of the user (heart rate, number of steps) than the daily face. Since the display area of the second hand 13 is small, a mode in which the second hand transmits through the back surface is not adopted, but the mode in which the second hand 13 transmits through the back surface may be adopted. Since the daily active face is a face displayed in a case where it is determined that the user is performing an action (walking, running, movement by bicycle, or the like), it is possible to assist the action of the user by displaying the activity information in an easily recognizable manner and to provide appropriate information. As described above, the electronic watch 100 can display a suitable face and information according to the situation of the user. Since the face is automatically switched according to the situation of the user, the entertainment of the electronic watch 100 is improved.

Figure 3C:
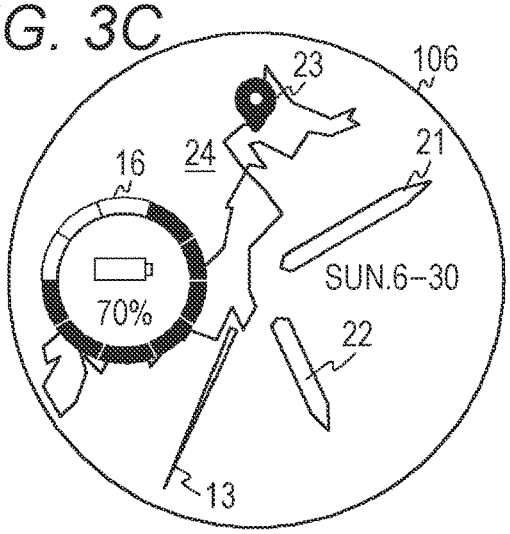
Figure 3D:
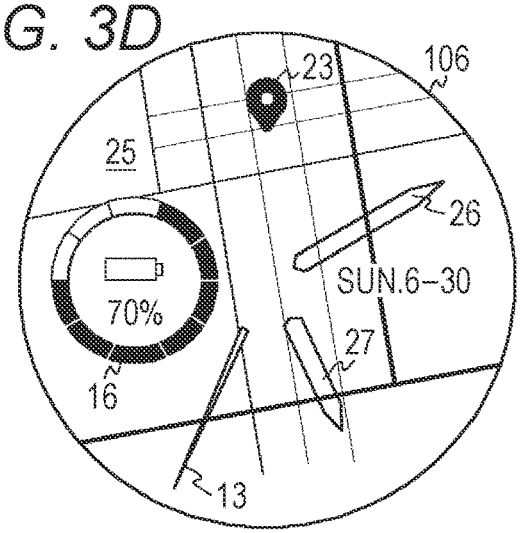

FIGS. 3C to 3F are faces displayed on the display unit 106 when it is determined that the user is in the outside daily action range. In a case where it is determined that the user is in the outside daily action range, the face further changes depending on whether the time zone is the home time zone of the user. FIGS. 3C and 3D illustrate faces displayed on the display unit 106 in a case where it is determined that the time zone is the home time zone of the user.

Then, FIG. 3C is a face displayed on the display unit 106 when it is determined that the user is not performing action, in other words, the user is stationary, and is also referred to as a non-daily home time zone face in this embodiment. FIG. 3D is a face displayed on the display unit 106 when it is determined that the user is performing action, and is also referred to as a non-daily home time zone active face in this embodiment.

On the non-daily home time zone face illustrated in FIG. 3C, a long hand 21, a short hand 22, a second hand 13, a remaining battery level display 16, a current position marker 23, and a map display 24 are displayed. The current time is indicated by the long hand 21, the short hand 22, and the second hand 13. The display size (thickness) of the long hand 21 and the short hand 22 on the non-daily home time zone face is smaller than that of the long hand 11 and the short hand 12 on the daily face. This improves the visibility of the current position marker 23 and the map display 24. The current position marker 23 indicates the current position on the map display 24. The map display 24 indicates a map around the current position using the entire surface of the display unit 106. The map displayed on the map display 24 is a schematic map having a scale larger than that of the detailed map display 25 described later. In FIG. 3C, a schematic map of Japan is displayed as the map display 24.

The map display 24 may be displayed on a part (for example, the upper half) of the display unit 106. The schematic map displayed on the map display 24 may be stored in advance in the ROM 102, for example.

On the non-daily home time zone face, the long hand 21, the short hand 22, the second hand 13, and the remaining battery level display 16 are displayed on a display layer higher than (in the front side of) the current position marker 23 and the map display 24. On the non-daily home time zone face, the long hand 21, the short hand 22, and the second hand 13 do not transmit through the lower (rear side) layer, and are displayed in a mode of being superimposed on the remaining battery level display 16, the current position marker 23, and the map display 24. As a result, on the non-daily home time zone face displayed when it is determined that the user is stationary, the user can roughly grasp the current position and easily grasp the current time.

In this embodiment, as the display layer of the color liquid crystal of the display unit 106, at least three display layers of a display layer (upper layer) of the long hand 21, the short hand 22, and the second hand 13, a display layer (middle layer) of the remaining battery level display 16, and a display layer (lower layer) of the current position marker 23 and the map display 24 are provided. The number of display layers of the color liquid crystal of the display unit 106 may be more than three, and may be two or less as long as various types of information can be suitably displayed.

On the non-daily home time zone active face illustrated in FIG. 3D, a long hand 26, a short hand 27, the second hand 13, the remaining battery level display 16, the current position marker 23, and a detailed map display 25 are displayed. The current time is indicated by the long hand 26, the short hand 27, and the second hand 13. On the non-daily home time zone active face, the types of information displayed are similar to those on the non-daily home time zone face, but the displayed map is the detailed map display 25. The map displayed on the detailed map display 25 is a detailed map smaller in scale than that of the map display 24.

The detailed map displayed on the detailed map display 25 has a larger data amount than that of the schematic map, and thus may be acquired from the outside via the communication unit 103.

The long hand 26 and the short hand 27 of the non-daily home time zone active face are displayed in the same size as the long hand 21 and the short hand 22 in a mode of transmitting through the back surface. As a result, on the non-daily home time zone active face, a more detailed current position can be grasped by the detailed map display 25, and information regarding the current position of the user can be more easily visually recognized than on the non-daily home time zone face. Since the non-daily home time zone active face is a face displayed in a case where it is determined that the user is performing an action (walking, running, movement by bicycle, or the like) outside the daily action range, the user can easily perform the action by the detailed display of the current position. As described above, the electronic watch 100 can display a suitable face and information according to the situation of the user. Since the face is automatically switched according to the situation of the user, the entertainment of the electronic watch 100 is improved.

Figure 3E:
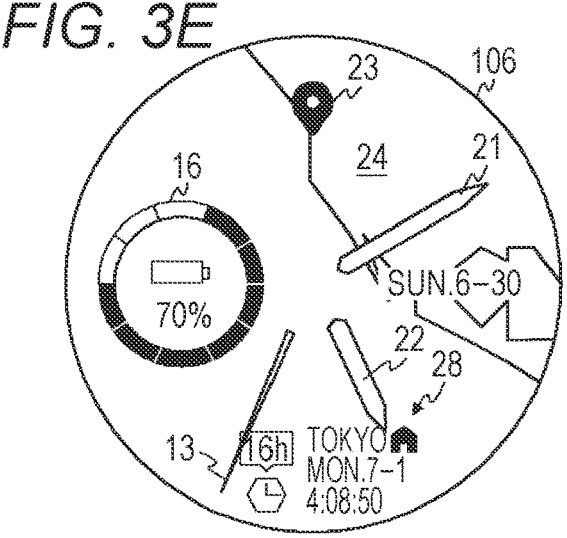
Figure 3F:
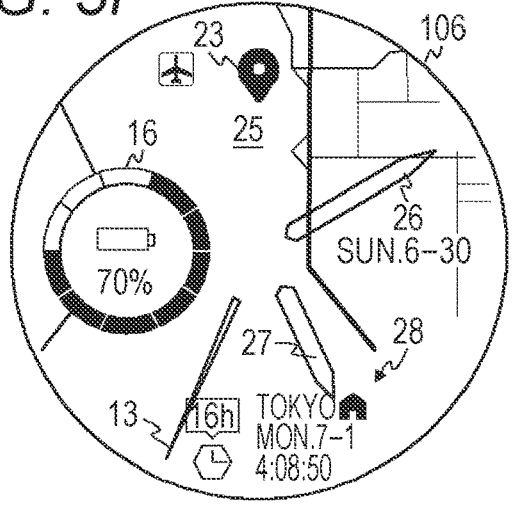

FIGS. 3E and 3F illustrate faces displayed on the display unit 106 in a case where it is determined that the time zone is the outside home time zone of the user.

Then, FIG. 3E is a face displayed on the display unit 106 when it is determined that the user is not performing action, in other words, the user is stationary, and is also referred to as a non-daily outside home time zone face in this embodiment. FIG. 3F is a face displayed on the display unit 106 when it is determined that the user is performing action, and is also referred to as a non-daily outside home time zone active face in this embodiment.

On the non-daily outside home time zone face illustrated in FIG. 3E, the long hand 21, the short hand 22, the second hand 13, the remaining battery level display 16, the current position marker 23, the map display 24, and home time zone information 28 are displayed. On the non-daily outside home time zone face, the types of information displayed on the non-daily home time zone face are generally similar, but the home time zone information 28 is added. The home time zone information 28 indicates a name of a preset home time zone, a date and time of the home time zone, and information on time difference between the home time zone and a currently set time zone (current position). The home time zone information 28 only needs to include at least information regarding the home time zone, and for example, only the date and time of the home time zone may be displayed. In FIG. 3E, a schematic map of the United States is displayed as the map display 24.

On the non-daily outside home time zone active face illustrated in FIG. 3F, the long hand 26, the short hand 27, the second hand 13, the remaining battery level display 16, the current position marker 23, the detailed map display 25, and home time zone information 28 are displayed. On the non-daily outside home time zone active face, the types of information displayed on the non-daily home time zone active face are generally similar, but the home time zone information 28 is added.

As described above, since the home time zone information 28 is displayed on both the non-daily outside home time zone face and the non-daily outside home time zone active face, the time of the home time zone and the time difference from the home time zone can be grasped even in a case where the user moves out of the home time zone. As described above, the electronic watch 100 can display a suitable face and information according to the situation of the user. Since the face is automatically switched according to the situation of the user, the entertainment of the electronic watch 100 is improved.

As described above, the electronic watch 100 according to the present embodiment is configured such that the face of the electronic watch 100 (the display mode of the display device carried by the subject) is automatically switched by using, as a trigger, the occurrence of three conditions: the action or the stationary state of the user (subject) (the determination as to whether the second condition is satisfied); the movement from the inside of the daily action range to the outside of the daily action range or the movement from the outside of the daily action range to the inside of the daily action range (the determination as to whether the first condition is satisfied); and the switching of the time zone from the home time zone to the outside of the home time zone or the switching from the outside of the home time zone to the home time zone (the determination as to whether the second condition is satisfied) (on the basis of the determination result as to whether the first condition is satisfied and the determination result as to whether the second condition is satisfied). As a result, a suitable face and information according to the situation of the user can be displayed, and the entertainment of the electronic watch 100 is improved.

In determining the switching of the time zone to the inside and outside of the home time zone, it may be determined that the user has moved from the home time zone to the outside of the home time zone or moved from the outside of the home time zone to the home time zone.

In the electronic watch 100 according to this embodiment, control is made such that two combinations are different from each other, the combinations being a combination of a display mode (FIG. 3B) of the daily active face when the user is in the daily action range (the first condition is satisfied) and performing an action (the second condition is satisfied), and a display mode (FIG. 3A) of the daily face when the user is in the daily action range (the first condition is satisfied) and is stationary (the second condition is not satisfied), and a combination of a non-daily active face (non-daily home time zone active face (FIG. 3D) and a non-daily outside home time zone active face (FIG. 3F) when the user is outside the daily action range (the first condition is not satisfied) and is performing an action (the second condition is satisfied) and a non-daily face (a non-daily home time zone face (FIG. 3C) and a non-daily outside home time zone face (FIG. 3E) when the user is outside the daily action range (the first condition is not satisfied) and is stationary (the second condition is not satisfied). As a result, a suitable face and information according to the situation of the user can be displayed, and the entertainment of the electronic watch 100 is improved.

The electronic watch 100 according to the present embodiment displays time information (long hands 11, 19, 21, 26, short hands 12, 20, 22, 27, second hand 13) by display imitating an analog watch and subject information (heart rate displays 14, 17, step number displays 15, 18, remaining battery level display 16, current position marker 23, map display 24, detailed map display 25, home time zone information 28) related to the user (subject) on the display unit 106. On the active face (FIGS. 3B, 3D, and 3F) in a case where it is determined that the user is performing an action, the long hands 19 and 26 and the short hands 20 and 27 are displayed in a mode of transmitting through the back surface, so that the display mode is controlled such that the visibility of the time information is lower than that on the face (FIGS. 3A, 3C, and 3E) in a case where it is determined that the user is stationary. On the active face (FIGS. 3B, 3D, and 3F) in a case where it is determined that the user is performing an action, the heart rate display 17 and the step number display 18 are displayed in a mode of being larger than the heart rate display 14 and the step number display 15, and the detailed map display 25 smaller in scale than the map display 24 is displayed. Therefore, the display mode is controlled such that the visibility of the subject information is higher than that on the face (FIGS. 3A, 3C, and 3E) in a case where it is determined that the user is stationary. As described above, since the active face is a face displayed in a case where it is determined that the user is performing an action (walking, running, movement by bicycle, or the like), it is possible to assist the action of the user by displaying the subject information in an easily recognizable manner and to provide appropriate information.

In this embodiment, the display mode of the face when it is determined that the current position of the user (subject) is within the daily action range, the display mode of the face when it is determined that the current position of the user is outside the daily action range, and the display mode of the display unit 106 of the electronic watch 100 are controlled. As a result, it is possible to display a suitable face and information according to the current position of the user. Since the face is automatically switched according to the situation of the user, the entertainment of the electronic watch 100 is improved.

In a case where the current position of the user is outside the daily action range, information including map information (first information) such as the current position marker 23, the map display 24, and the detailed map display 25 is displayed. Meanwhile, the map information (first information) is not displayed within the daily action range set by the user, and information such as a heart rate and the number of steps other than the map information is displayed. As described above, in a case where the user is within the daily action range of the user and it is assumed that the user grasps the geography, it is possible to display other information (heart rate, number of steps) without displaying unnecessary information, and thus, it is possible to display a suitable face and information according to the situation of the user.

In this embodiment, the first information that is not displayed when the current position of the user is within the daily action range and is displayed when the current position of the user is outside the daily action range is map information, but the first information is not limited to map information. For example, the first information may be information of a recommended store near the current position of the user, an advertisement of a store near the current position of the user, new information regarding the vicinity of the current position of the user, or the like. Regarding these pieces of information, new information may be acquired from the outside and displayed as needed via the communication unit 103. As described above, it is sufficient that the first information is useful information in a case where the user is outside the daily action range. As a result, it is possible to display a suitable face and information in a case where the user is outside the daily action range.

In this embodiment, the map information is not displayed when the current position of the user is within the daily action range, but the map information may be displayed even when the user is within the daily action range. For example, in a case where the user is performing an action (daily active face), map information may be displayed.

In the electronic watch 100 according to this embodiment, when it is determined that the current position of the user (subject) is not within the daily action range, information on whether the time zone is the home time zone of the user is acquired, and control is made such that the display mode of the face changes according to the acquired information (FIGS. 3C to 3F). As a result, it is possible to display a suitable face and information in a case where the user is outside the daily action range.

When it is determined that the current position of the user (subject) is not within the daily action range, information on at least one of the time zone and the motion state of the user may be acquired, and the display mode of the face may be controlled according to the acquired information. For example, in a case where the current position of the user (subject) is within the daily action range, a common face may be used regardless of the motion information of the user (whether the user is performing an action), and in a case where the current position of the user is outside the daily action range, the face may be switched according to the motion information of the user (whether the user is performing an action).

Although the date and time display (here, "SUN. 6-30") is displayed on all the faces illustrated in FIGS. 3A to 3E, the date and time display may not be displayed, and there may be a face on which the date and time display is not displayed. The user may be allowed to select on/off of the date and time display.

Although the remaining battery level display 16 is displayed on all faces, there may be a face that is not displayed.

Other information (for example, calorie consumption information or the like) may be displayed instead of the remaining battery level display 16, or the user may select information to be displayed.

On the face illustrated in FIGS. 3A to 3F, the display mode of the long hand and the short hand changes according to the situation of the user, but the display mode of the long hand and the short hand may not change. The analog watch may be switched to the digital clock according to the situation of the user. The second hand 13 may be hidden on some faces.

In each of a case where the user is within the daily action range, a case where the user is outside the daily action range and the time zone is the home time zone, and a case where the user is outside the daily action range and outside the home time zone, the types of information to be displayed are the same, but the types of information to be displayed may be different, regardless of the determination result of the action of the user.

The types of information displayed on each face illustrated in FIGS. 3A to 3E are examples, and arbitrary information may be displayed as long as suitable display can be performed according to the situation of the user. Information displayed on each face may be customized by the user. In this embodiment, six types of faces are provided, but the number of types of faces is not limited thereto. For example, if the display mode of the face is controlled on the basis of the determination result as to whether the first condition is satisfied and the determination result as to whether the second condition is satisfied, the number may be smaller than six. If the display mode of the face is controlled to be different depending on whether the current position of the user is within the daily action range, the number may be smaller than six.

Figures 4A, 4B:
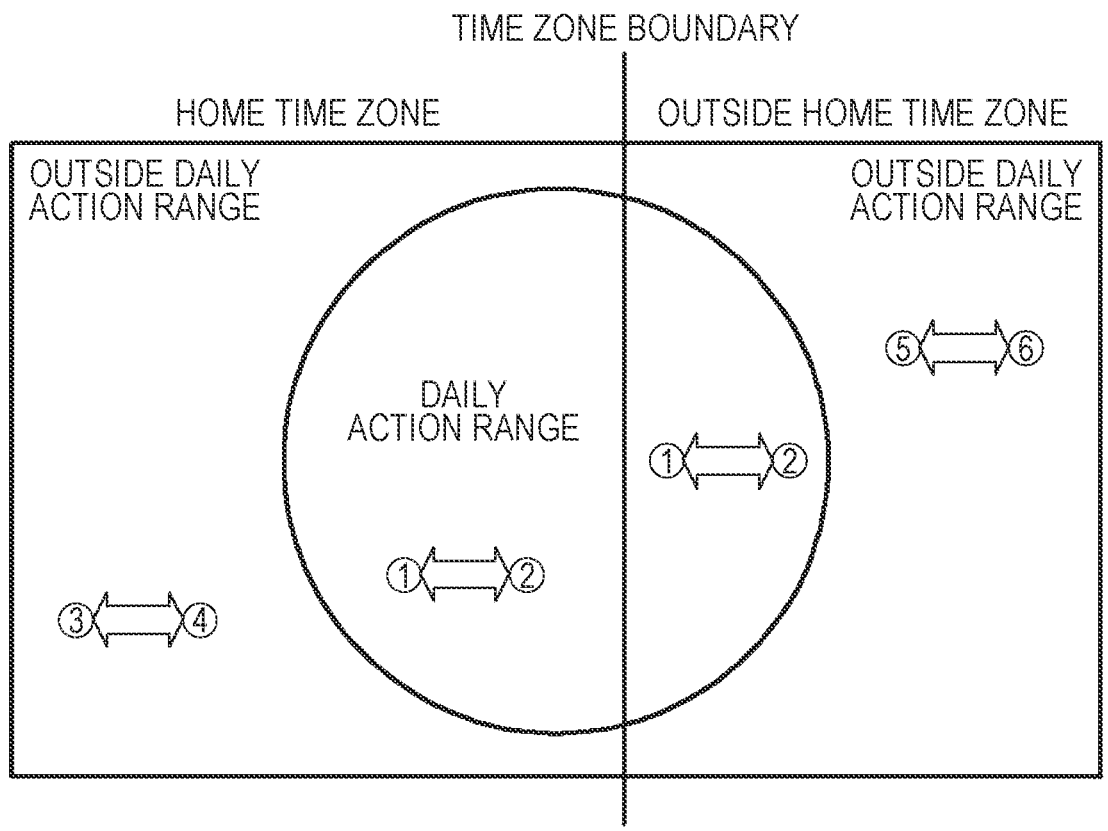
FIG. 4A is a diagram illustrating an example of switching of the face.
FIG. 4B is a diagram illustrating face numbers of the faces.

FIG. 4A illustrates an example of switching of the face. As illustrated in FIG. 4B, assuming that the face number of the daily face (FIG. 3A) is "1" and the face number of the daily active face (FIG. 3B) is "2", the face is switched between the daily face and the daily active face depending on whether the user is performing an action or stationary within the daily action range as illustrated in FIG. 4A.

As illustrated in FIG. 4B, assuming that the face number of the non-daily home time zone face (FIG. 3C) is "3" and the face number of the non-daily home time zone active face (FIG. 3D) is "4", the face is switched between the non-daily home time zone face and the non-daily home time zone active face depending on whether the user is performing an action or stationary in the outside of the daily action range and in the home time zone, as illustrated in FIG. 4A.

As illustrated in FIG. 4B, assuming that the face number of the non-daily outside home time zone face (FIG. 3E) is "5" and the face number of the non-daily outside home time zone active face (FIG. 3F) is "6", as illustrated in FIG. 4A, the face is switched between the non-daily outside home time zone face and the non-daily outside home time zone active face depending on whether the user is performing an action or stationary outside the daily action range and outside the home time zone.

As illustrated in FIG. 4A, since there may be a boundary between time zones within the daily action range, the time zones may be switched within the daily action range. However, since it is assumed that the effect of displaying the time difference information and the map is small within the daily action range, in this embodiment, the switching of the face due to the change in the time zone is not performed within the daily action range. The home time zone face and the outside home time zone face within the daily action range may be provided, and the face may be switched between when the time zone is the home time zone and when the time zone is outside the home time zone within the daily action range.

FIG. 5 is a transition diagram of the face. In the present embodiment, the face of the electronic watch 100 is switched with the presence or absence of the action of the user, movement inside and outside the daily action range of the user, and switching of the time zone inside and outside the home time zone as triggers. However, in this embodiment, even if a trigger for switching the face occurs, the face may not transition depending on the face at that time.

As illustrated in FIG. 5, in the case of the daily face, the transition to the daily active face is made when an action of the user is detected. In the case of the daily active face, the transition to the daily active face is made when a stationary state of the user is detected. In the case of the daily face, when the movement of the user to the outside of the daily action range is detected, if the time zone is the home time zone, the transition is made to the non-daily home time zone face, and if the time zone is outside the home time zone, the transition is made to the non-daily outside home time zone face.

In the case of the non-daily home time zone face, the transition is made to the non-daily outside home time zone face when the switching of the time zone to the outside of the home time zone is detected. In the case of the non-daily outside home time zone face, the transition is made to the non-daily home time zone face when the switching of the time zone to the home time zone is detected.

In the case of the non-daily home time zone face, the transition is made to the non-daily home time zone active face when an action of the user is detected. In the case of the non-daily home time zone active face, the transition is made to the non-daily home time zone face when a stationary state of the user is detected. In the case of the non-daily outside home time zone face, the transition is made to the non-daily outside home time zone active face when the user's action is detected. In the case of the non-daily outside home time zone active face, the transition is made to the non-daily outside home time zone face when a stationary state of the user is detected.

On the other hand, in this embodiment, in the case of the daily active face that is a state where the second condition regarding at least one of the current position of the user (subject) and the motion state of the subject is satisfied, even if the user moves out of the daily action range and the first condition regarding the current position of the user is satisfied, the face does not transition and the daily active face is maintained. In the case of the non-daily active face (non-daily home time zone active face and non-daily outside home time zone active face) in a state where the second condition is satisfied, even if the user moves into the daily action range and the first condition is satisfied, the face does not transition and the non-daily active face is maintained. In the case of the non-daily active face, the face does not transition even when the time zone changes. That is, in the case of the active face (daily active face, non-daily home time zone active face, and non-daily outside home time zone active face) that is a state where a second condition related to motion information of the user (subject) is satisfied, motion inside and outside the daily action range and switching of the time zone to inside and outside the home time zone are restricted so as not to be detected as triggers for switching the face (by restricting determination as to whether the first condition is satisfied), and even when the first condition is switched, a state before the first condition is switched is maintained. As a result, it is possible to suppress the number of manufacturing steps, the processing load, and the battery consumption as compared with a case where switching triggers of all faces are constantly monitored. In the case where there is movement inside and outside the daily action range or switching of the time zone to inside and outside the home time zone on the active face, the face temporarily transitions to a face (daily face or the like) at the time of stationary detection, then the triggers is enabled to be detected, and the face transitions to the face corresponding to the detected trigger.

In the case of the active face, as a trigger for switching the face, movement inside and outside the daily action range and switching of the time zone inside and outside the home time zone are not detected at all, but the frequency and the number of times of detection may be limited.

In the case of the active face (daily active face, non-daily home time zone active face, and non-daily outside home time zone active face), at least one of movement inside and outside the daily action range and switching of the time zone to inside and outside the home time zone may be detected as a trigger for switching the face, and the face may be switched according to the detection result.

Instead of not detecting the presence or absence of a switching trigger (movement inside and outside the daily action range and switching of the time zone to inside and outside the home time zone) on a predetermined face in the case of the active face, detection of the presence or absence of the switching trigger on the face may be performed, and whether the trigger has been detected may not be determined, or the face before the detection of the trigger may be maintained even if the trigger is detected. That is, it is sufficient that, when the state is switched between the state where the first condition is satisfied and the state where the first condition is not satisfied in the state where the second condition is satisfied, the display mode of the display device is controlled to be maintained in the state before the first condition is switched. As a result, a processing load of determination and display in the electronic watch 100 can be reduced, and battery consumption can also be suppressed.

Next, the operation of the electronic watch 100 according to the present embodiment will be described. FIG. 6 is a flowchart illustrating an example of initial setting processing executed by the CPU 110 of the electronic watch 100 according to the present embodiment. The initial setting processing is processing for setting the home time zone and the daily action range at the time of the first activation of the electronic watch 100. For example, the CPU 110 starts initial setting processing when the electronic watch 100 is activated.

In the initial setting processing, the CPU 110 first determines whether it is the first activation (step S11). Whether it is the first activation may be determined by, for example, a flag for first activation determination reset at the time of factory shipment or initialization. If it is not the first activation (step S11; No), the CPU 110 ends the initial setting processing.

If it is the first activation (step S11; Yes), the CPU 110 presents the time zone (step S12), and prompts the user to select the home time zone. Then, the CPU 110 waits until the selection operation for the home time zone is performed (step S13).

Figure 7A:
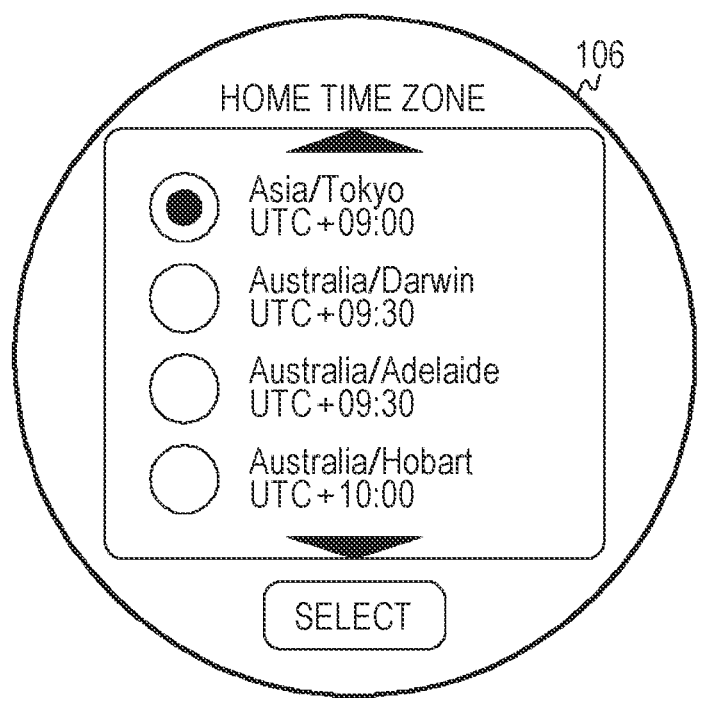
FIG. 7A is a diagram illustrating a display example of a home time zone setting screen.

FIG. 7A is a display example of the home time zone setting screen displayed on the display unit 106 in step S12. As illustrated in FIG. 7A, the CPU 110 displays a plurality of time zones, a radio button for selecting a time zone, a scroll button, a select button, and the like on the display unit 106 as a home time zone setting screen. For example, when the select button is pressed on the touch panel, the time zone selected by the radio button is set as the home time zone. The list of time zones may be acquired from, for example, an operating system (OS) of the microcomputer 101.

As the time zone initially displayed on the home time zone setting screen, in a case where the current position can be specified by the communication unit 103 or the positioning unit 109, a time zone corresponding to the current position may be displayed, or an arbitrary time zone (for example, a sales area) may be set at the time of factory shipment.

In a case where the selection operation for the home time zone has been performed (step S13; Yes), the CPU 110 sets the selected time zone as the home time zone of the user (step S14). In step S14, the CPU 110 may store the selected time zone as the home time zone in a predetermined region of the RAM 111. In a case where the selection operation of the home time zone has not been performed within the predetermined time, the processing related to the setting of the home time zone may be skipped, or the initial setting processing may be terminated.

Thereafter, the CPU 110 presents the map around the current position and the daily action range (step S15) to prompt the user to select the daily action range. Then, the CPU 110 waits until the selection operation for the daily action range is performed (step S16). The daily action range is an action range in the daily life of the user, and can be set by the user at the time of the first activation in this embodiment.

Figure 7B:
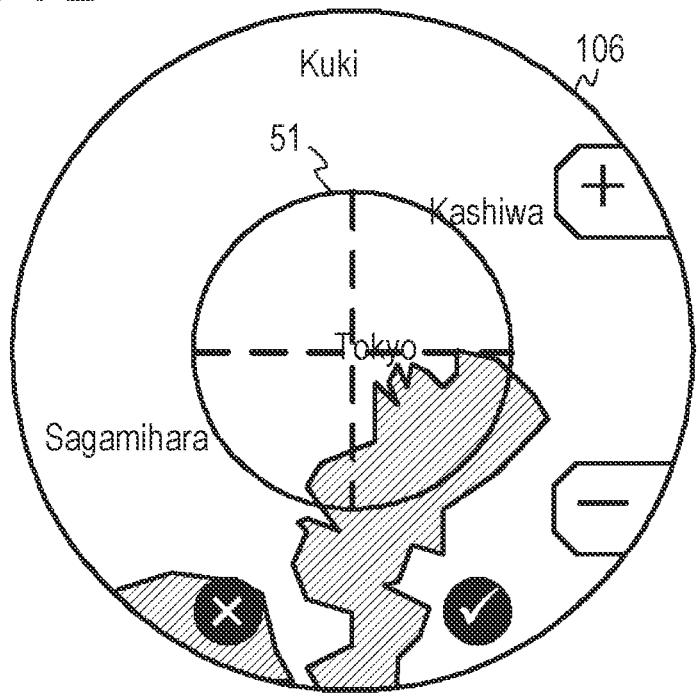
FIG. 7B is a diagram illustrating a display example of a daily action range setting screen.
Figure 8:
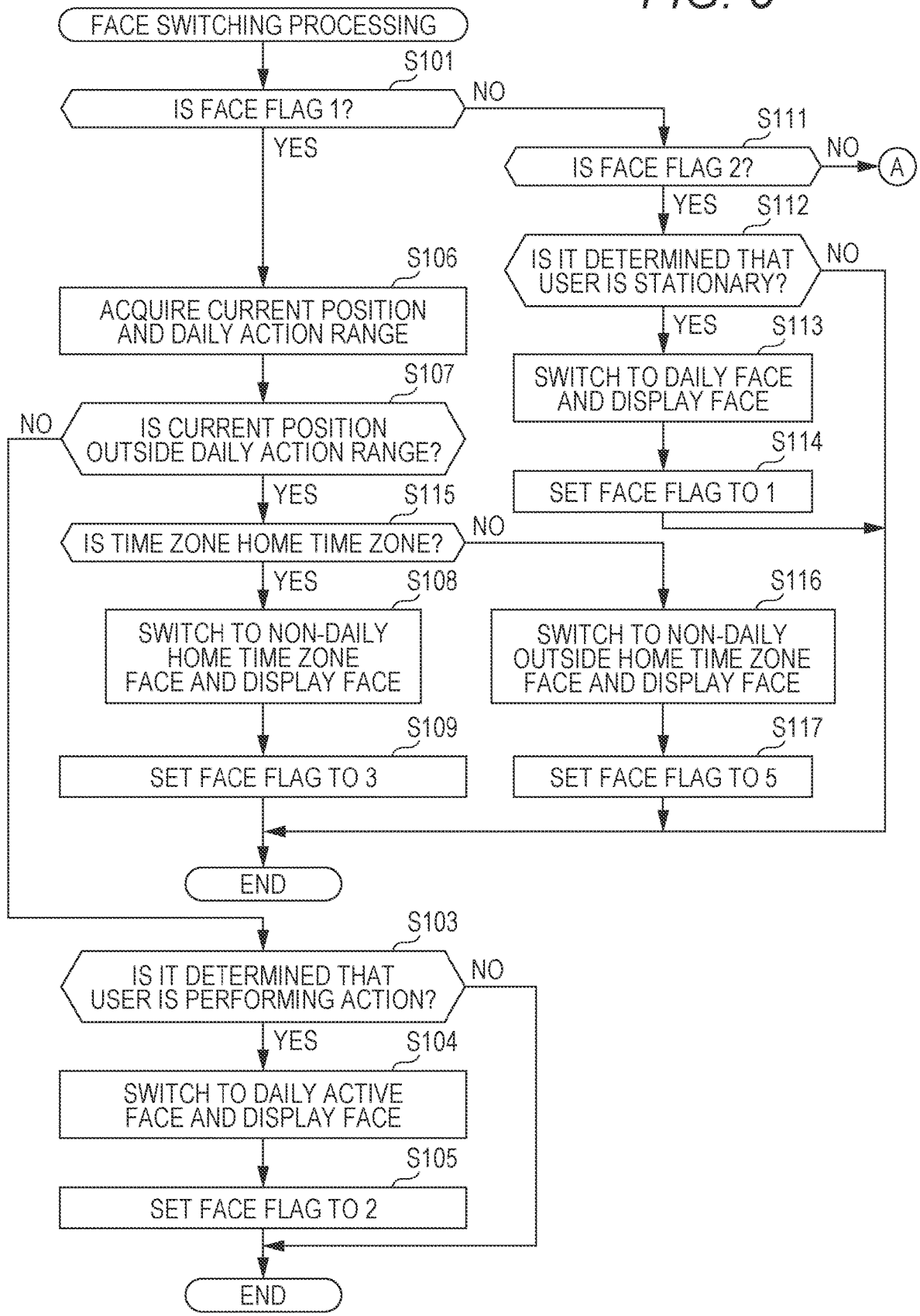
FIG. 8 is a flowchart illustrating an example of face switching processing.
Figure 9:
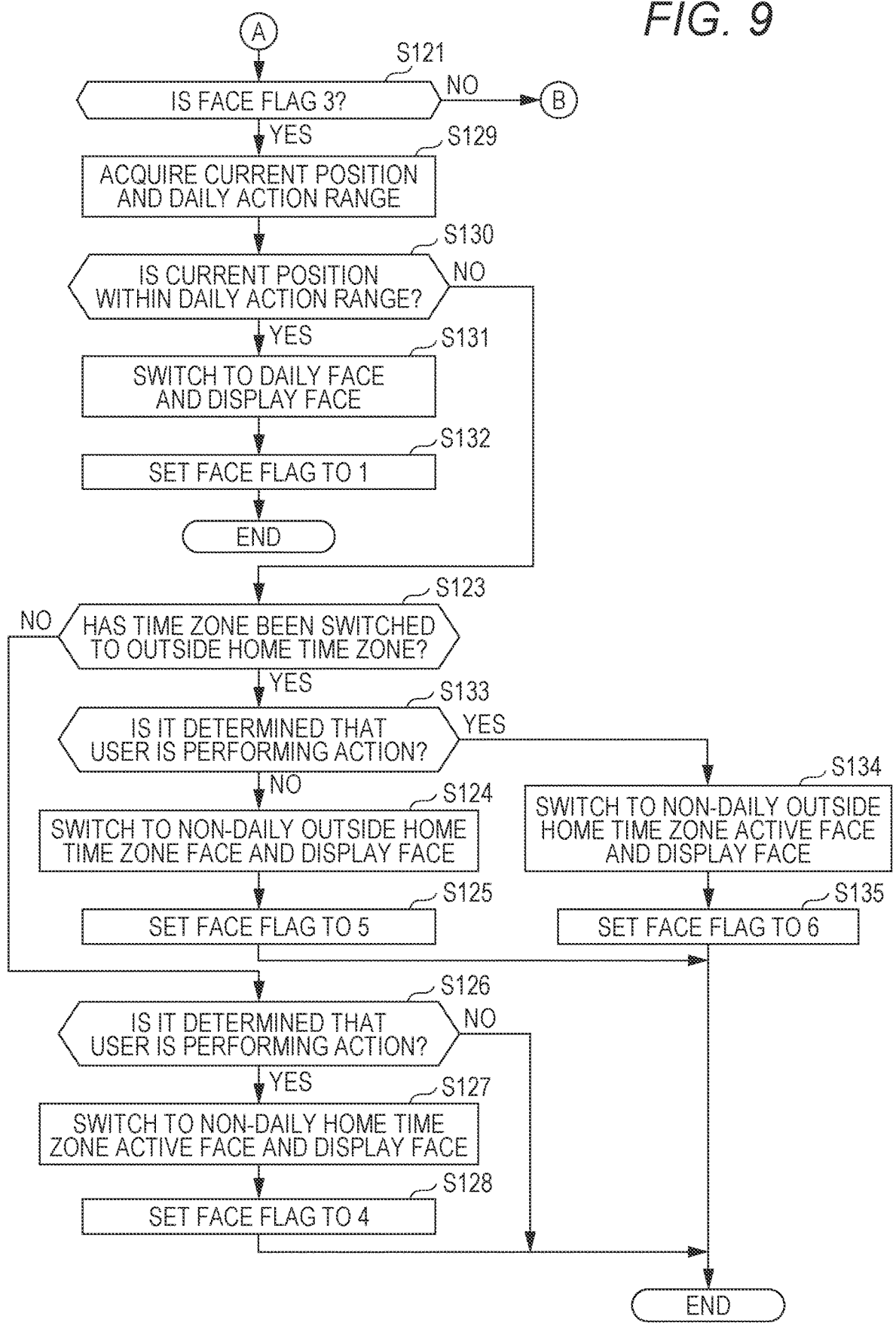
FIG. 9 is a flowchart illustrating an example of face switching processing.
Figure 10:
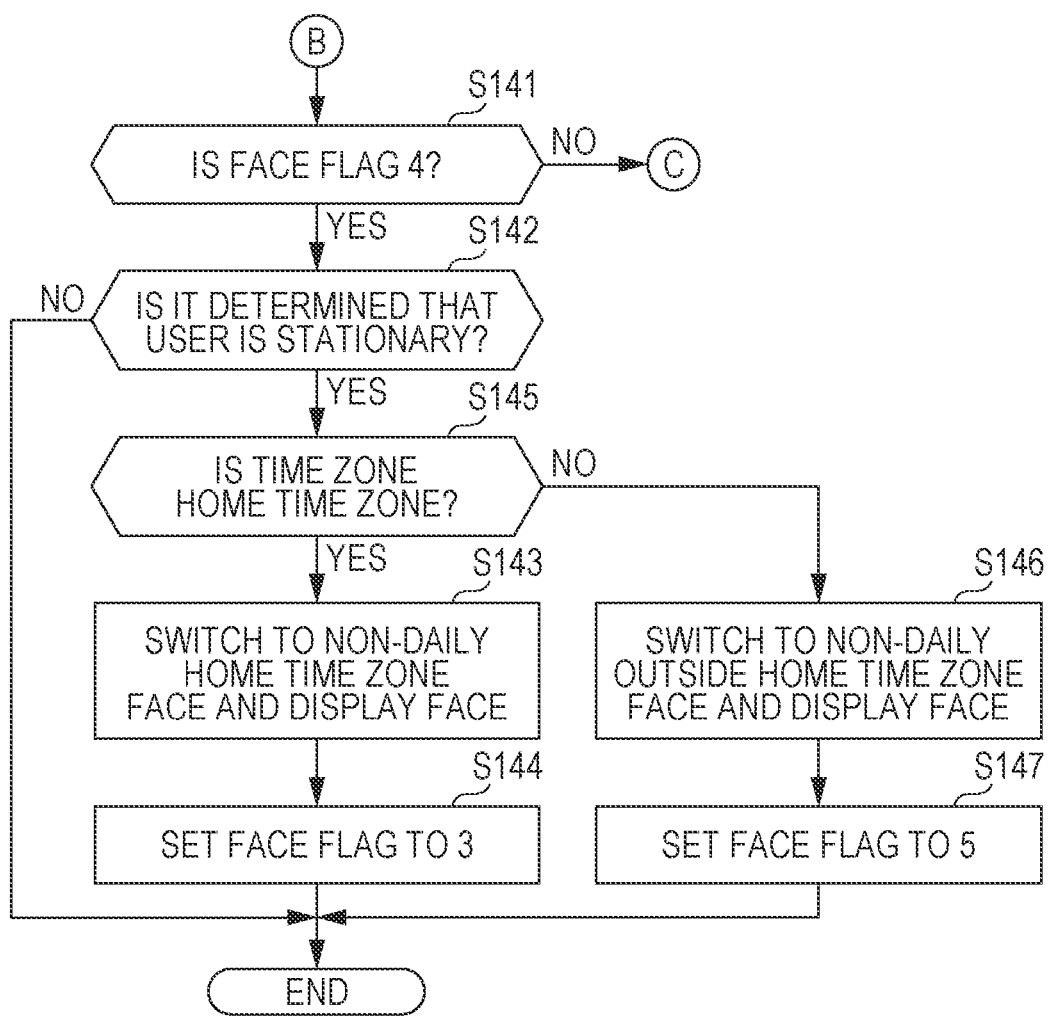
FIG. 10 is a flowchart illustrating an example of face switching processing.
Figure 11:
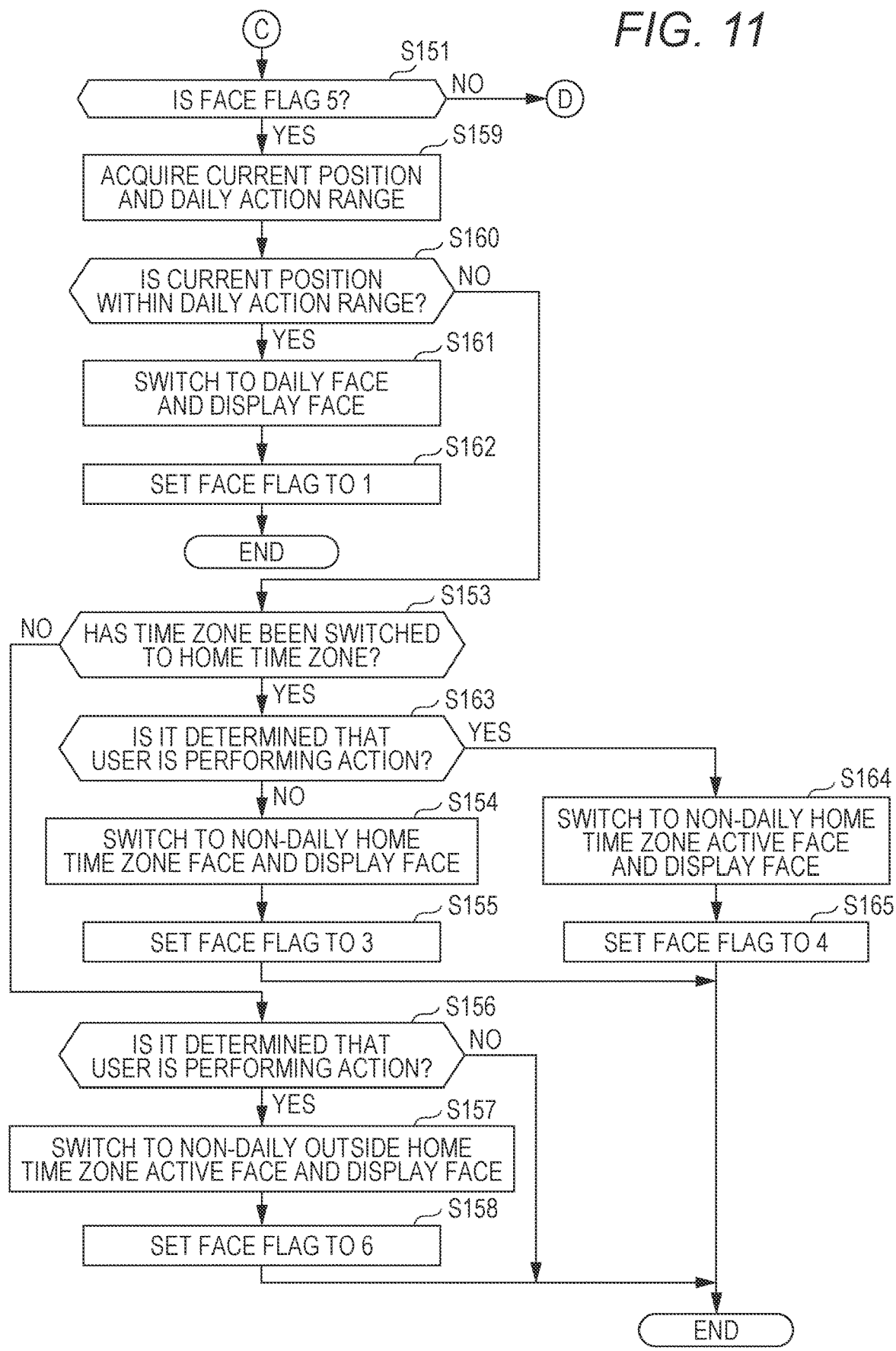
FIG. 11 is a flowchart illustrating an example of face switching processing.
Figure 12:
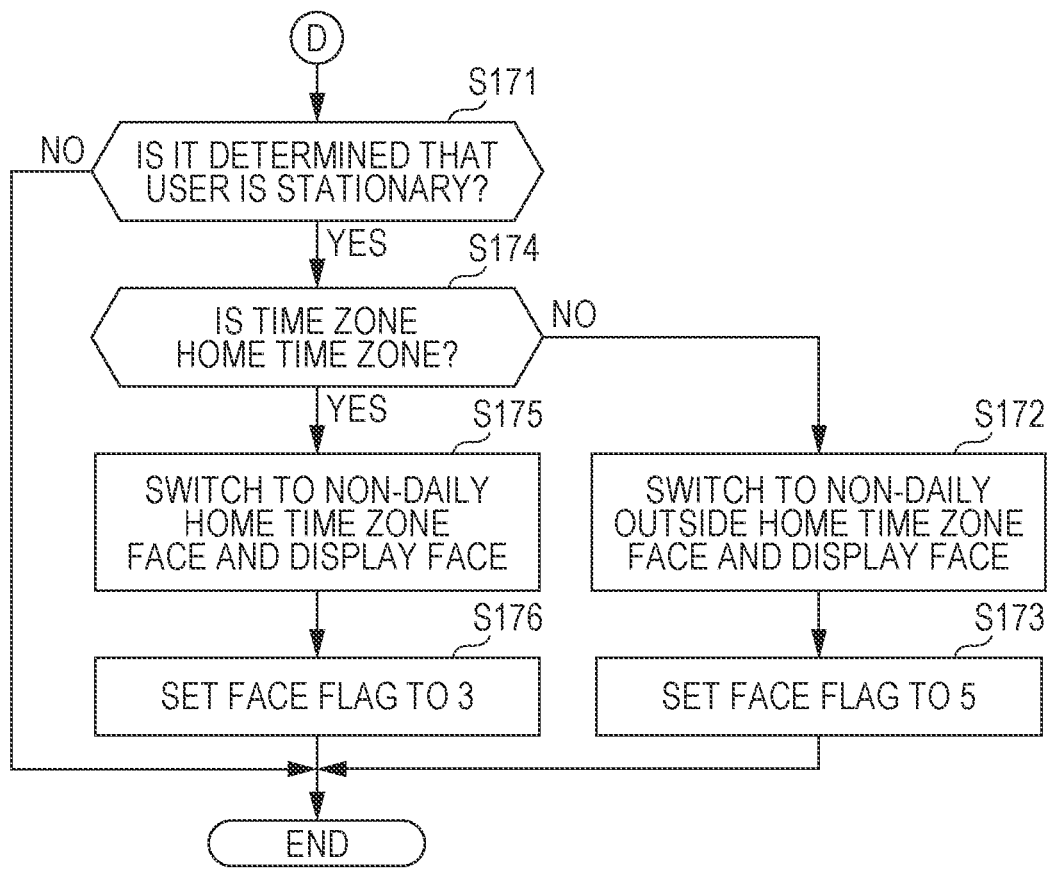
FIG. 12 is a flowchart illustrating an example of face switching processing.

FIG. 7B is a display example of the daily action range setting screen displayed on the display unit 106 in step S15. As illustrated in FIG. 7B, the CPU 110 displays, on the display unit 106, a map around the current position, a scaling button, a select button, a cancel button, a daily action range designation cursor 51, and the like as the daily action range setting screen. For example, the range selected by the daily action range designation cursor 51 is set as the daily action range by moving and scaling the daily action range designation cursor 51 by touch panel operation and pressing the select button (check mark).

For example, the map initially displayed on the daily action range setting screen may be displayed with the current position that has been most recently acquired by the communication unit 103 or the positioning unit 109 as the center, and the daily action range designation cursor 51 may be designated so as to designate a range having a certain distance (for example, a certain distance in the range of 10 km to 100 km, for example, 25 km) from the center. In a case where the current position has not been acquired at all, an arbitrary point may be displayed, or the user may be prompted to input the current position. In this case, the setting of the daily action range may be ended by prompting the user to set the daily action range later.

In a case where the selection operation for the daily action range has been performed (step S16; Yes), the CPU 110 sets the selected range as the daily action range of the user (step S17). In step S17, the CPU 110 may store the selected range as a daily action range in a predetermined region of the RAM 111. Note that, in a case where the selection operation for the daily action range has not been performed within the predetermined time, the processing related to the setting of the daily action range may be skipped, or the initial setting processing may be terminated.

Thereafter, the CPU 110 displays the daily face on the display unit 106 of the electronic watch 100 (step S18), sets 1 to the face flag indicating the current face (step S19), and ends the initial setting processing. The face flag is a flag for specifying the current face, and corresponds to the face number illustrated in FIG. 4B. The face flag is stored in a predetermined region of the RAM 111 and takes a value of 1 to 6 according to the current face. In the initial setting processing, the daily face is displayed as the initial face, but a face according to a situation may be displayed.

Although an example in which the home time zone and the daily action range are set at the time of the first activation has been described, setting of the home time zone and the daily action range at the time of the first activation may be skipped. The user may set the home time zone and the daily action range at an arbitrary timing by operating the operation reception unit 108. The home time zone and the daily action range that have been set once may be reset.

Although the example in which the user manually sets the home time zone and the daily action range has been described, the CPU 110 may acquire the current position information and the time zone information of the user (subject) at the time of the first activation, and automatically set at least one of the home time zone and the daily action range. For example, the CPU 110 may accumulate and store the action range of the user, automatically determine the action range in daily life from the accumulated data, and set the determined action range as the daily action range of the user. The home time zone and the daily action range that are automatically set as described above may be reset by the user later. As a result, the burden on the user can be reduced, and the home time zone and the daily action range can be set without bothering the user.

FIGS. 8 to 12 are flowcharts illustrating an example of face switching processing performed by the CPU 110 of the electronic watch 100 according to the present embodiment. The face switching processing is processing for switching the face displayed on the display unit 106 of the electronic watch 100 according to the detected situation. For example, the CPU 110 performs the face switching processing at a certain cycle (for example, every 10 minutes) after activation. As a result, it is determined whether a trigger for face switching has occurred every certain period, and face switching can be performed every certain period. As described above, since the face switching process is performed every certain period, it is possible to prevent the face from being frequently switched and becoming bothersome. If the current position is always specified by the positioning unit 109 or the action of the user is monitored by the sensor unit 117, the processing load and the battery consumption increase. In this embodiment, since the face switching processing is performed every certain period, the processing load and the battery consumption can be reduced.

In the face switching processing, the CPU 110 first determines whether the face flag is 1 corresponding to the daily face (step S101). When the face flag is 1 (step S101; Yes), the CPU 110 acquires the information of the current position from the positioning unit 109, and acquires the information of the daily action range of the user from the RAM 111 (step S106). Then, it is determined whether the current position is outside the daily action range of the user (step S107).

When it is determined that the current position is outside the daily action range of the user (step S107; Yes), the CPU 110 acquires the currently set time zone and home time zone from the RAM 111 or the like, and determines whether the time zone is the home time zone (step S115).

If the time zone is the home time zone (step S115; Yes), the CPU 110 displays the face of the electronic watch 100 by switching the face to the non-daily home time zone face (see FIG. 3C) (step S108), sets 3 corresponding to the non-daily home time zone face to the face flag (step S109), and ends the face switching processing.

If the time zone is outside the home time zone (step S115; No), the CPU 110 displays the face of the electronic watch 100 by switching the face to the non-daily outside home time zone face (see FIG. 3E) (step S116), sets 5 corresponding to the non-daily outside home time zone face to the face flag (step S117), and ends the face switching processing.

When it is determined that the current position is within the daily action range of the user (step S107; No), the CPU 110 determines whether the user is performing an action (walking, running, movement by bicycle, or the like) on the basis of the information from the positioning unit 109 and the sensor unit 117 (step S103). In step S103, for example, it may be determined that the user is performing an action in a case where it is detected that the user is continuously moving for a certain period of time or in a case where it is detected that the moving distance of the user within a certain period of time is a certain distance or more on the basis of information from the positioning unit 109 or the sensor unit 117. When it is determined that the user is not performing an action (step S103; No), the CPU 110 ends the face switching processing. In this case, the face remains the daily face (face flag=1).

When it is determined that the user is performing an action (step S103; Yes), the CPU 110 switches and displays the face of the electronic watch 100 to the daily active face (see FIG. 3B) (step S104), sets 2 corresponding to the daily active face to the face flag (step S105), and ends the face switching processing.

When the face flag is not 1 corresponding to the daily face (step S101; No), the CPU 110 determines whether the face flag is 2 corresponding to the daily active face (step S111). When the face flag is 2 (step S111; Yes), the CPU 110 determines whether the user is stationary on the basis of the information from the positioning unit 109 and the sensor unit 117 (step S112). In step S112, for example, it may be determined that the user is stationary in a case where it is detected that the user is not moving for a certain period of time or in a case where it is detected that the moving distance of the user within a certain period of time is less than a certain distance on the basis of information from the positioning unit 109 or the sensor unit 117. When it is determined that the user is not stationary (step S112; No), the CPU 110 ends the face switching processing. In this case, the face remains the daily active face (face flag=2).

When it is determined that the user is stationary (step S112; Yes), the CPU 110 displays the face of the electronic watch 100 by switching the face to the daily face (see FIG. 3A) (step S113), sets 1 corresponding to the daily face to the face flag (step S114), and ends the face switching processing.

When the face flag is not 2 corresponding to the daily active face (step S111; No), the process proceeds to FIG. 9, and the CPU 110 determines whether the face flag is 3 corresponding to the non-daily home time zone face (step S121). When the face flag is 3 (step S121; Yes), the CPU 110 acquires the information of the current position from the positioning unit 109, and acquires the information of the daily action range of the user from the RAM 111 (step S129). Then, the CPU 110 determines whether the current position is within the daily action range of the user (step S130).

When it is determined that the current position is within the daily action range of the user (step S130; Yes), the CPU 110 displays the face of the electronic watch 100 by switching the face to the daily face (see FIG. 3A) (step S131), sets 1 corresponding to the daily face to the face flag (step S132), and ends the face switching processing.

When it is determined that the current position is outside the daily action range of the user (not within the daily action range of the user) (step S130; No), the CPU 110 determines whether the time zone has been switched to the outside of the home time zone (step S123). In step S123, for example, the CPU 110 determines whether the communication unit 103 has received a notification of switching of the time zone to the outside of the home time zone from an external device (for example, a smartphone), or whether the user has operated the operation reception unit 108 to switch the time zone to the outside of the home time zone.

When the time zone has been switched to the outside of the home time zone (step S123; Yes), the CPU 110 determines whether the user is performing an action (walking, running, movement by bicycle, or the like) on the basis of the information from the positioning unit 109 and the sensor unit 117 (step S133). When it is determined that the user is not performing an action (step S133; No), the CPU 110 displays the face of the electronic watch 100 by switching the face to the non-daily outside home time zone face (see FIG. 3E) (step S124), sets 5 corresponding to the non-daily outside home time zone face to the face flag (step S125), and ends the face switching processing.

When it is determined that the user is performing an action (step S133; Yes), the CPU 110 displays the face of the electronic watch 100 by switching the face to the non-daily outside home time zone active face (see FIG. 3F) (step S134), sets 6 corresponding to the non-daily outside home time zone active face to the face flag (step S135), and ends the face switching processing.

When the time zone has not been switched to the outside of the home time zone (step S123; No), the CPU 110 determines whether the user is performing an action (walking, running, movement by bicycle, or the like) on the basis of the information from the positioning unit 109 and the sensor unit 117 (step S126). When it is determined that the user is not performing an action (step S126; No), the CPU 110 ends the face switching processing. In this case, the face remains the non-daily home time zone face (face flag=3).

When it is determined that the user is performing an action (step S126; Yes), the CPU 110 displays the face of the electronic watch 100 by switching the face to the non-daily home time zone active face (see FIG. 3D) (step S127), sets 4 corresponding to the non-daily home time zone active face to the face flag (step S128), and ends the face switching processing.

When the face flag is not 3 corresponding to the non-daily home time zone face (step S121; No), the process proceeds to FIG. 10, and the CPU 110 determines whether the face flag is 4 corresponding to the non-daily home time zone active face (step S141). When the face flag is 4 (step S141; Yes), the CPU 110 determines whether the user is stationary on the basis of the information from the positioning unit 109 and the sensor unit 117 (step S142). When it is determined that the user is not stationary (step S142; No), the CPU 110 ends the face switching processing. In this case, the face remains the non-daily home time zone active face (face flag=4).

When it is determined that the user is stationary (step S142; Yes), the CPU 110 acquires the currently set time zone and home time zone from the RAM 111 or the like, and determines whether the time zone is the home time zone (step S145).

If the time zone is the home time zone (step S145; Yes), the CPU 110 displays the face of the electronic watch 100 by switching the face to the non-daily home time zone face (see FIG. 3C) (step S143), sets 3 corresponding to the non-daily home time zone face to the face flag (step S144), and ends the face switching processing.

If the time zone is outside the home time zone (step S145; No), the CPU 110 displays the face of the electronic watch 100 by switching the face to the non-daily outside home time zone face (see FIG. 3E) (step S146), sets 5 corresponding to the non-daily outside home time zone face to the face flag (step S147), and ends the face switching processing.

When the face flag is not 4 corresponding to the non-daily home time zone active face (step S141; No), the process proceeds to FIG. 11, and the CPU 110 determines whether the face flag is 5 corresponding to the non-daily outside home time zone face (step S151). When the face flag is 5 corresponding to the non-daily outside home time zone face (step S151; Yes), the CPU 110 acquires the information of the current position from the positioning unit 109, and acquires the information of the daily action range of the user from the RAM 111 (step S159). Then, the CPU 110 determines whether the current position is within the daily action range of the user (step S160).

When it is determined that the current position is within the daily action range of the user (step S160; Yes), the CPU 110 displays the face of the electronic watch 100 by switching the face to the daily face (see FIG. 3A) (step S161), sets 1 corresponding to the daily face to the face flag (step S162), and ends the face switching processing.

When it is determined that the current position is outside the daily action range of the user (not within the daily action range) (step S160; No), the CPU 110 determines whether the time zone has been switched to the home time zone (step S153). In step S153, for example, the CPU 110 determines whether the communication unit 103 has received a notification of switching of the time zone to the home time zone from an external device (for example, a smartphone), or whether the user has operated the operation reception unit 108 to switch the time zone to the home time zone.

When the time zone has been switched to the home time zone (step S153; Yes), the CPU 110 determines whether the user is performing an action (walking, running, movement by bicycle, or the like) on the basis of the information from the positioning unit 109 and the sensor unit 117 (step S163). When it is determined that the user is not performing an action (step S163; No), the CPU 110 displays the face of the electronic watch 100 by switching the face to the non-daily home time zone face (see FIG. 3C) (step S154), sets 3 corresponding to the non-daily home time zone face to the face flag (step S155), and ends the face switching processing.

When it is determined that the user is performing an action (step S163; Yes), the CPU 110 displays the face of the electronic watch 100 by switching the face to the non-daily home time zone active face (see FIG. 3D) (step S164), sets 4 corresponding to the non-daily home time zone active face to the face flag (step S165), and ends the face switching processing.

When the time zone has not been switched to the home time zone (step S153; No), the CPU 110 determines whether the user is performing an action (walking, running, movement by bicycle, or the like) on the basis of the information from the positioning unit 109 and the sensor unit 117 (step S156). When it is determined that the user is not performing an action (step S156; No), the CPU 110 ends the face switching processing. In this case, the face remains the non-daily outside home time zone face (face flag=5).

When it is determined that the user is performing an action (step S156; Yes), the CPU 110 displays the face of the electronic watch 100 by switching the face to the non-daily outside home time zone active face (see FIG. 3F) (step S157), sets 6 corresponding to the non-daily outside home time zone active face to the face flag (step S158), and ends the face switching processing.

When the face flag is not 5 corresponding to the non-daily outside home time zone face (step S151; No), that is, when the face flag is not any of 1 to 5 and is 6 corresponding to the non-daily outside home time zone active face, the process proceeds to FIG. 12, and the CPU 110 determines whether the user is stationary on the basis of information from the positioning unit 109 and the sensor unit 117 (step S171). When it is determined that the user is not stationary (step S171; No), the CPU 110 ends the face switching processing. In this case, the face remains the non-daily outside home time zone active face (face flag=6).

When it is determined that the user is stationary (step S171; Yes), the CPU 110 acquires the currently set time zone and home time zone from the RAM 111 or the like, and determines whether the time zone is the home time zone (step S174).

If the time zone is the home time zone (step S174; Yes), the CPU 110 displays the face of the electronic watch 100 by switching the face to the non-daily home time zone face (see FIG. 3C) (step S175), sets 3 corresponding to the non-daily home time zone face to the face flag (step S176), and ends the face switching processing.

If the time zone is outside the home time zone (step S174; No), the CPU 110 displays the face of the electronic watch 100 by switching the face to the non-daily outside home time zone face (see FIG. 3E) (step S172), sets 5 corresponding to the non-daily outside home time zone face to the face flag (step S173), and ends the face switching processing.

By performing the face switching processing described above, it is possible to switch to the face according to the situation of the user as illustrated in FIGS. 3A to 5 according to the occurrence of the switching trigger of the face.

In this embodiment, the priority order of the switching trigger of the face is the order of movement determination into and out of the daily action range>switching determination of the time zone into and out of the home time zone>determination of the action of the user, and when a plurality of triggers occur at the same time, the face is changed on the basis of a trigger with a higher priority. That is, the determination as to whether the first condition that is the determination as to whether the action is within the daily action range is satisfied is performed in preference to the time zone switching determination and the determination as to whether the second condition that is the determination of the action of the user is satisfied. As a result, it is possible to prevent an error from occurring even when a switching trigger for a plurality of faces occurs. The priority order of the triggers is not limited to this order, and may be any order, and the priority order may be set by the user.

As described above, the electronic watch 100 (in particular, the CPU 110 as a processor) as the display control device of this embodiment determines whether the first condition (movement determination into or out of the daily action range) regarding the current position of the subject (user) is satisfied, determines whether a second condition (action determination of the user and switching determination of the time zone) including a condition relating to at least one of the current position of the subject and the motion state of the subject different from the first condition is satisfied, and controls the display mode of the display device (the display unit 106 of the electronic watch 100) carried by the subject on the basis of the determination result as to whether the first condition is satisfied and the determination result as to whether the second condition is satisfied (the display control as illustrated in FIGS. 3A to 3F is performed).

As a result, a suitable face and information according to the situation of the user can be displayed, and the entertainment of the electronic watch 100 is improved.

The CPU 110 controls the display mode such that the combination of the display mode (FIG. 3B) when the first condition is satisfied and the second condition is satisfied and the display mode (FIG. 3A) when the first condition is satisfied and the second condition is not satisfied, the combination of the display mode (FIGS. 3D and 3F) when the first condition is not satisfied and the second condition is satisfied and the display mode (FIGS. 3C and 3E) when the first condition is not satisfied and the second condition is not satisfied are different from each other.

As a result, a suitable face and information according to the situation of the user can be displayed, and the entertainment of the electronic watch 100 is improved.

It is sufficient that, when the state is switched between the state where the first condition is satisfied and the state where the first condition is not satisfied in the state where the second condition is satisfied, the CPU 110 controls the display mode of the display device to be maintained in the state before the first condition is switched (FIG. 5).

As a result, it is possible to suppress the number of manufacturing steps, the processing load, and the battery consumption as compared with a case where switching triggers of all faces (whether the first condition is satisfied) are constantly monitored.

in a state where the second condition related to the motion state of the subject is satisfied, the CPU 110 restricts the determination as to whether the first condition is satisfied.

As a result, a processing load of determination and display in the electronic watch 100 can be reduced, and battery consumption can also be suppressed.

The information displayed on the display device includes at least time information (long hands 11, 19, 21, 26, short hands 12, 20, 22, 27, second hand 13) related to a current time and subject information (heart rate displays 14, 17, step number displays 15, 18, remaining battery level display 16, current position marker 23, map display 24, detailed map display 25 . . . , home time zone information 28) related to the subject.

When the second condition related to the motion state of the subject is satisfied (FIGS. 3B, 3D, and 3F), the CPU 110 controls the display mode such that the visibility of the time information is lower than that when the second condition related to the motion state of the subject is not satisfied (FIGS. 3A, 3C, and 3E), and when the second condition related to the motion state of the subject is satisfied (FIGS. 3B, 3D, and 3F), the CPU 110 controls the display mode such that the visibility of the subject information is higher than that when the second condition related to the motion state of the subject is not satisfied (FIGS. 3A, 3C, and 3E).

Since the active face (FIGS. 3B, 3D, and 3F) is a face displayed in a case where it is determined that the user is performing an action (walking, running, movement by bicycle, or the like), it is possible to assist the action of the user by displaying the subject information in an easily recognizable manner and to provide appropriate information.

The CPU 110 determines whether the first condition is satisfied in preference to the determination of whether the second condition is satisfied.

As a result, it is possible to prevent an error from occurring even when a switching trigger for a plurality of faces occurs.

The present invention is not limited to the above embodiment, and various modifications and applications are possible, and further features may be added. The processing contents and the determination method of the flowchart described in the above embodiment are merely examples, and any processing contents and determination method may be used as long as the processing contents and the determination method can exhibit the same operations and effects as those of the above embodiment, and the change of the face described in the above embodiment can be suitably performed. The display example of the face illustrated in the above embodiment is an example, and can be appropriately changed as long as the same object can be achieved. All of the configurations described in the above embodiment are not essential configurations, and some of the configurations may be omitted.

In the above embodiment, the trigger for switching the face is that three types of conditions of the movement determination to the inside and outside of the daily action range, the switching of the time zone to the inside and outside of the time zone, and the action determination of the user are satisfied, but there may be other triggers for switching the face. For example, the face may be switched with a time zone or a day of the week such as daytime, nighttime, or early morning as a trigger. For example, the user can set the work time zone and the work day in advance, and in a case of the work time zone and the work day, the face of the electronic watch 100 may become a face for business, and in a case of not the work time zone and not the work day, the face of the electronic watch 100 may become a face for private. On at least one of the face for business and the face for private, the face may be further switched according to the switching trigger of the face of the above embodiment. For example, the face for business may employ a face (FIGS. 3A to 3F) that is switched by occurrence of the trigger of the above embodiment for the face for private by simple display and preventing the face from being switched even when a trigger other than a time zone occurs.

The trigger for switching the face may be at least two triggers of a first condition (for example, whether the subject (user) is within the daily action range) related to the current position of the subject (user) and a second condition (switching determination of the time zone to the inside and outside of the home time zone or action determination of the user) including a condition related to at least one of the current position of the subject and the motion state of the subject, and may be two types. For example, in a case where the user is outside the daily action range without performing the time zone switching determination to the inside and outside of the home time zone, a common face may be displayed regardless of whether the time zone is the home time zone.

When the face of the electronic watch 100 is switched, the face may be switched so as to change over time by animation. By switching the face over time, even in a case where a plurality of triggers for face switching are generated, switching to the face corresponding to the occurrence of the plurality of triggers for face switching can be performed without discomfort.

When a condition for switching the face of the electronic watch 100 is satisfied, that is, when the satisfaction state of at least one of the first and second conditions is changed (from satisfied to not satisfied or from not satisfied to satisfied), notification of the switching of the face may be provided in advance by vibration by a vibrator or sound. By providing notification as described above, it is possible to make an appeal for the switching of the board surface to the user, and the amusement is improved. This effect can be effectively obtained particularly in a case where the face is switched by animation as described above.

Figure 13:
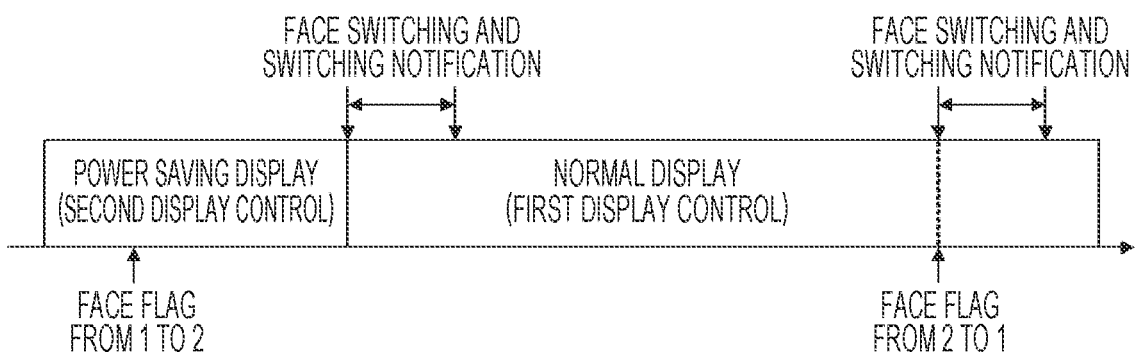
FIG. 13 is a diagram illustrating a switching timing of a face in a modification.

The display of the display unit 106 may be selectively switchable between normal display (first display control) by color liquid crystal and power saving display (second display control) with reduced power consumption by monochrome liquid crystal, for example, on the basis of operation by the user and a notification result by the sensor unit 117. In this case, as illustrated in FIG. 13, when a trigger (face flag from 1 to 2) for face switching of the normal display occurs during the power saving display (during the execution of the second display control), the occurrence of the trigger may be stored, and the display may be switched to a new face when the display returns to the normal display (first display control), and notification of the switching of the face may be provided. As a result, even when the power saving display is performed, the face can be suitably switched according to the situation of the user, and the power consumption can also be suppressed.

As described above, the CPU 110 of the electronic watch 100 can selectively perform a first display control (normal display) for displaying certain information and a second display control (power saving display) for not displaying certain information as the display control for controlling the display on the display device (the display unit 106 of the electronic watch 100), and in a case where a new display mode as the display mode is selected during the execution of the second display control, when the display control is switched from the second display control to the first display control, displays the certain information on the display device in the new display mode (FIG. 13).

As a result, even when the second display control (power saving display) is performed, the face can be suitably switched according to the situation of the user, and the power consumption can also be suppressed.

The power saving display (second display control) is not limited to the display using the monochrome liquid crystal, and may be a display in which the power consumption is suppressed by reducing the information to be displayed as compared with the normal display (first display control), or may be a display in which the display of the display unit 106 is turned off. The normal display (first display control) may be switched to the power saving display (second display control) according to the remaining battery level.

In the above embodiment, the example in which the display control device and the display device are the electronic watch 100 has been described, but the display control device and the display device may be any display device carried by the subject, and may be wearable glasses (smart glasses), a smartphone, a tablet terminal, a portable information terminal, or the like. The display control device and the display device may be configured by different devices. For example, display control of a display device such as an electronic watch carried by the subject may be performed by an external display control device such as a smartphone.

In the above embodiment, the example in which the CPU 110 performs the control operation has been described. However, the control operation is not limited to software control by the CPU 110. Part or all of the control operation may be performed using a hardware configuration such as a dedicated logic circuit.

In the above description, the ROM 102 including a non-volatile memory such as a flash memory has been described as an example of a computer-readable medium that stores the program 115 related to the wireless control processing of the present invention. However, the computer-readable medium is not limited thereto, and a portable recording medium such as a hard disk drive (HDD), a compact disc read only memory (CD-ROM), or a digital versatile disc (DVD) may be applied. As a medium for providing data of the program according to the present invention via a communication line, a carrier wave is also applied to the present invention.

Specific details such as the configuration, the control procedure, and the display example described in the above embodiment can be appropriately changed without departing from the gist of the present invention.

Although some embodiments of the present invention have been described, the scope of the present invention is not limited to the above-described embodiments, and includes the scope of the invention described in the claims and the scope of equivalents thereof.

What is claimed is:

1. A display control device comprising:
   at least one processor configured to execute a program stored in at least one memory,
   wherein the at least one processor
   determines whether a first condition related to a current position of a subject is satisfied, wherein the first condition is a condition that the current position of the subject is within a preset daily action range of the subject,
   determines whether a second condition different from the first condition and including a condition related to at least one of the current position of the subject and a motion state of the subject is satisfied, and
   controls a display mode of a display device carried by the subject based on a determination result as to whether the first condition is satisfied and a determination result as to whether the second condition is satisfied.

2. The display control device according to claim 1, wherein
   the at least one processor controls the display mode in a manner that a combination of the display mode when the first condition is satisfied and the second condition is satisfied and the display mode when the first condition is satisfied and the second condition is not satisfied, and a combination of the display mode when the first condition is not satisfied and the second condition is satisfied and the display mode when the first condition is not satisfied and the second condition is not satisfied are different from each other.

3. The display control device according to claim 1, wherein
   when a state is switched between a state where the first condition is satisfied and a state where the first condition is not satisfied in a state where the second condition is satisfied, the at least one processor controls the display mode of the display device to be maintained in a state before the first condition is switched.

4. The display control device according to claim 3, wherein
   in a state where the second condition related to a motion state of the subject is satisfied, the determination as to whether the first condition is satisfied is restricted.

5. The display control device according to claim 1, wherein
   information displayed on the display device includes at least time information related to a current time and subject information related to the subject, and
   when the second condition related to a motion state of the subject is satisfied, the at least one processor controls the display mode in a manner that visibility of the time information is lower than that when the second condition related to the motion state of the subject is not satisfied, and
   when the second condition related to the motion state of the subject is satisfied, the at least one processor controls the display mode in a manner that the visibility of the subject information is higher than that when the second condition related to the motion state of the subject is not satisfied.

6. The display control device according to claim 1, wherein
   the at least one processor determines whether the first condition is satisfied in preference to determination of whether the second condition is satisfied.

7. The display control device according to claim 1, wherein
   the at least one processor is capable of selectively performing a first display control for displaying certain information and a second display control for not displaying the certain information as a display control for controlling display on the display device, and
   in a case where a new display mode as the display mode is selected during execution of the second display control, when the display control is switched from the second display control to the first display control, the at least one processor displays the certain information on the display device in the new display mode.

8. The display control device according to claim 1, wherein
   the at least one processor
   acquires the preset daily action range of the subject,
   determines whether the current position of the subject is within the preset daily action range acquired to determine whether the first condition is satisfied,
   when it is determined that the current position of the subject is within the preset daily action range, displays information other than first information included in certain information on the display device, and
   when it is determined that the current position of the subject is not within the preset daily action range, displays the first information in a manner of being included in the certain information on the display device.

9. The display control device according to claim 8, wherein
   the first information is map information.

10. An electronic watch comprising the display control device and the display device according to claim 1.

11. A display control method performed by a display control device, the method comprising:
    determining whether a first condition related to a current position of a subject is satisfied, wherein the first condition is a condition that the current position of the subject is within a preset daily action range of the subject;
    determining whether a second condition different from the first condition and including a condition related to at least one of the current position of the subject and a motion state of the subject is satisfied; and controlling a display mode of a display device carried by the subject based on a determination result as to whether the first condition is satisfied and a determination result as to whether the second condition is satisfied.

12. A non-transitory recording medium storing a program for causing a computer to achieve
a function of determining whether a first condition related to a current position of a subject is satisfied, wherein the first condition is a condition that the current position of the subject is within a preset daily action range of the subject,
a function of determining whether a second condition different from the first condition and including a condition related to at least one of the current position of the subject and a motion state of the subject is satisfied, and
a function of controlling a display mode of a display device carried by the subject based on a determination result as to whether the first condition is satisfied and a determination result as to whether the second condition is satisfied.

13. The display control device according to claim 1, wherein
the at least one processor controls the display mode in a manner that the display mode when the first condition is satisfied and the second condition is satisfied, the display mode when the first condition is satisfied and the second condition is not satisfied, the display mode when the first condition is not satisfied and the second condition is satisfied, and the display mode when the first condition is not satisfied and the second condition is not satisfied, are different from one another.

* * * * *

UNITED STATES PATENT AND TRADEMARK OFFICE
CERTIFICATE OF CORRECTION

| | |
|---|---|
| PATENT NO. | : 12,099,332 B2 |
| APPLICATION NO. | : 17/465901 |
| DATED | : September 24, 2024 |
| INVENTOR(S) | : Toshihiro Kiuchi et al. |

It is certified that error appears in the above-identified patent and that said Letters Patent is hereby corrected as shown below:

In the Claims

Column 24, Claim 5, Line 5, after "subject," delete "and".

Signed and Sealed this
Nineteenth Day of November, 2024

Katherine Kelly Vidal
*Director of the United States Patent and Trademark Office*